(12) United States Patent
Brombach et al.

(10) Patent No.: US 11,070,057 B2
(45) Date of Patent: Jul. 20, 2021

(54) METHOD FOR STARTING AN ENERGY GENERATION NETWORK

(71) Applicant: Wobben Properties GmbH, Aurich (DE)

(72) Inventors: Johannes Brombach, Berlin (DE); Ingo Mackensen, Aurich (DE); Kai Busker, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/494,214

(22) PCT Filed: Mar. 22, 2018

(86) PCT No.: PCT/EP2018/057371
§ 371 (c)(1),
(2) Date: Sep. 13, 2019

(87) PCT Pub. No.: WO2018/172489
PCT Pub. Date: Sep. 27, 2018

(65) Prior Publication Data
US 2020/0044448 A1    Feb. 6, 2020

(30) Foreign Application Priority Data
Mar. 23, 2017   (DE) ..................... 10 2017 106 338.2

(51) Int. Cl.
*H01J 3/14*   (2006.01)
*F03D 9/25*   (2016.01)
(Continued)

(52) U.S. Cl.
CPC ................ *H02J 3/14* (2013.01); *F03D 9/257* (2017.02); *H02J 3/16* (2013.01); *H02J 3/386* (2013.01); *H02J 3/46* (2013.01)

(58) Field of Classification Search
CPC ...... H02J 3/14; H02J 3/16; H02J 3/386; H02J 3/46; H02J 3/381; H02J 2300/28;
(Continued)

(56) References Cited

U.S. PATENT DOCUMENTS 7,528,496 B2    5/2009 Fortmann
8,803,344 B2    8/2014 Kyriakides et al.
(Continued)

FOREIGN PATENT DOCUMENTS

DE    102013102603 A1    9/2014
DE    102014214151 A1    1/2016
(Continued)

*Primary Examiner* — Ziaul Karim
(74) *Attorney, Agent, or Firm* — Seed IP Law Group LLP

(57) ABSTRACT

A method for starting a farm grid of a wind farm is provided. The energy generation grid has at least one grid connection point connected to an electrical supply grid and the energy generation grid, in a normal operating mode, exchanges electrical power with the electrical supply grid via the grid connection point. The method includes selecting an establishment mode, different than the normal operating mode, if the electrical supply grid has a voltage drop or the energy generation grid is isolated from the electrical supply grid and operating the energy generation grid in the establishment mode. The establishment mode at least one voltage-influencing wind power installation for providing a wind farm grid voltage and at least one current-influencing wind power installation that synchronizes to the energy generation grid voltage. The wind power installations in total provide an electrical power at the level of an inherent need of the grid.

27 Claims, 8 Drawing Sheets

(51) Int. Cl.
*H02J 3/16* (2006.01)
*H02J 3/38* (2006.01)
*H02J 3/46* (2006.01)
*H02J 3/14* (2006.01)

(58) Field of Classification Search
CPC .. H02J 3/40; F03D 9/257; Y02E 10/76; Y02E 10/72; F05B 2260/85
See application file for complete search history.

(56) References Cited

U.S. PATENT DOCUMENTS

| | | |
|---|---|---|
| 9,518,559 B2 | 12/2016 | Hiromasa et al. |
| 9,831,678 B2 | 11/2017 | Premm et al. |
| 9,920,746 B2 | 3/2018 | Diedrichs et al. |
| 10,156,225 B2 | 12/2018 | Huang et al. |
| 10,487,801 B2 | 11/2019 | Beekmann et al. |
| 2007/0108769 A1 | 5/2007 | Wobben |
| 2012/0326516 A1* | 12/2012 | Gurunathan .............. H02J 1/00 307/72 |
| 2013/0249300 A1* | 9/2013 | Fishman .................. H02J 3/46 307/82 |
| 2013/0265809 A1* | 10/2013 | Gupta ..................... H02J 3/386 363/131 |
| 2014/0351010 A1* | 11/2014 | Kong ..................... G06Q 40/04 705/7.29 |
| 2015/0028593 A1* | 1/2015 | Wobben .................. H02J 11/00 290/44 |
| 2015/0054280 A1 | 2/2015 | De Boer et al. |
| 2015/0159627 A1 | 6/2015 | Nielsen et al. |
| 2015/0380942 A1 | 12/2015 | Premm et al. |
| 2016/0032891 A1 | 2/2016 | Busker et al. |
| 2017/0009745 A1* | 1/2017 | Brogan ..................... H02P 9/48 |
| 2017/0074244 A1 | 3/2017 | Huang et al. |
| 2017/0163040 A1 | 6/2017 | Bamberger et al. |

FOREIGN PATENT DOCUMENTS

| | | |
|---|---|---|
| EP | 1665494 B1 | 5/2012 |
| JP | 2009036210 A | 2/2009 |
| JP | 2015527857 A | 9/2015 |
| JP | 2015201900 A | 11/2015 |
| JP | 2016515375 A | 5/2016 |
| JP | 2016515675 A | 5/2016 |
| RU | 2584630 C2 | 5/2016 |
| WO | 2011055218 A1 | 5/2011 |
| WO | 2016082070 A1 | 6/2016 |
| WO | 2016/139082 A1 | 9/2016 |

* cited by examiner

METHOD FOR STARTING AN ENERGY GENERATION NETWORK

BACKGROUND

Technical Field

The present invention relates to a method for starting an energy generation grid, in particular of a wind farm. Additionally, the present invention relates to a wind power installation, and it relates to a wind farm having at least one first and one second wind power installation.

Description of the Related Art

Electrical supply grids are known, and they are used to distribute electrical energy between energy suppliers and energy consumers. An electrical supply grid of this kind is today operated at an AC voltage at a predetermined grid frequency, for the most part 50 Hz or 60 Hz. Both the suppliers and the consumers have geared themselves to this frequency.

It is especially the case that a portion, for the most part a large portion, of the electrical supply grid is always in operation. When an electrical generation unit for supplying electrical energy to this electrical supply grid is connected, this generation unit can likewise orient itself to the electrical supply grid. In particular, an electrical generation unit of this kind is regularly initially provided with energy from the electrical supply grid so as thereby to supply power to any starting processes. In addition to the provision of energy therefor, the electrical supply grid also provides orientation and guidance in this case particularly for the grid frequency and the level of the voltage, however.

Some generation units, such as for example wind farms having multiple wind power installations, themselves have an internal electrical grid that could also be referred to as an energy generation grid. Such an energy generation grid is also usually in operation and has a grid frequency of the electrical supply grid to which it is synchronized. Additionally, the energy generation grid uses a point of common coupling, particularly a grid connection point, to supply to the electrical supply grid or to draw energy from the electrical supply grid, and its own voltage level at this point of common coupling matches the voltage level of the electrical supply grid. These two voltages are thus the same at that point or are in a particular ratio to one another in accordance with a transmission ratio of a transformer at this point of common coupling.

If the energy generation grid, that is to say in particular the farm grid, is now started, that is to say for example on initial startup or after an instance in which it has had to be ramped down, the energy generation grid can obtain energy for this from the electrical supply grid and gear itself and orient itself to the grid frequency and grid voltage prescribed by the electrical supply grid.

However, it has now been recognized that energy generation grids, particularly farm grids of wind farms, are becoming increasingly important in electrical supply grids. It may therefore be that the electrical supply grid cannot adequately conduct or support such a starting process for an energy generation grid. In particular, it may be to be expected that the electrical supply grid itself requires support. It has also been recognized that an energy generation grid, particularly a farm grid of a wind farm, should thus possibly also be capable of starting independently or even of providing support for the electrical supply grid, so that the electrical supply grid can possibly restart using the energy generation grid or at least recover from a situation in which the grid voltage has significantly dipped.

Particularly power stations provided hitherto that have been kept specifically for grid reestablishment or even black starting of an electrical supply grid may now be present less often or are meant to be dispensed with, which means that an electrical supply grid needs to manage without a special power station of this kind in order to start or to effect regeneration.

The German Patent and Trademark Office performed a search for the following prior art in the priority application for the present application: US 2017/0074244 A1, DE 10 2014 214 151 A1, DE 10 2013 102 603 A1, EP 1 665 494 B1 and US 2015/0159627 A1.

BRIEF SUMMARY

Provided is an energy generation grid, in particular a farm grid of a wind farm, that is able to start independently and without the aid of an electrical supply grid and is able to support or back up the electrical supply grid when starting, reestablishing or recovering from an instance of a voltage dip.

A method for starting an energy generation grid is provided. The energy generation grid proposed is in particular in the form of a farm grid of a wind farm and accordingly has multiple wind power installations. It is alternatively possible for another energy generation grid to be used that has multiple generators electrically connected to one another via a grid. There is fundamentally also the possibility of multiple wind farms or farm grids that are controlled together and possibly supplied to the electrical supply grid not just via one common grid connection point but possibly via multiple grid connection points. A possible energy generation grid is also a grid that has at least one wind farm or a farm grid. At any rate, the energy generation grid has at least one grid connection point connected to the electrical supply grid. In this arrangement, the energy generation grid exchanges electrical power with the electrical supply grid via the grid connection point in a normal operating mode. For the most part, this will involve the energy generation grid supplying electrical power to the electrical supply grid via the grid connection point. An alternative possibility in particular situations is that the energy generation grid draws electrical power from the electrical supply grid particularly for support purposes.

The method for starting the energy generation grid now proposes that an establishment mode is selected if the electrical supply grid has a voltage drop. In the electrical supply grid, the voltage in the electrical supplying grid, referred to as the grid voltage, has thus significantly dropped in this case. In particular, such a voltage drop also relates to a collapse or blackout of the electrical supply grid. In the case of a voltage drop, the establishment mode is selected or a change is made from the normal operating mode to the establishment mode. There is alternatively the possibility of the establishment mode being selected when the energy generation grid is isolated from the electrical supply grid. In particular, there is also the possibility of there being a voltage drop in the electrical supply grid and additionally the energy generation grid being isolated from the electrical supply grid. This grid isolation may thus also be present in the voltage drop of the electrical supply grid.

For the purpose of starting, the energy generation grid is therefore initially operated in this establishment mode. This operation of the energy generation grid in the establishment mode contains a few features. These first of all include a voltage-influencing device or means—there may also be multiple voltage influencing means—providing an energy generation grid voltage. The voltage influencing means can also be a voltage influencing wind power installation, for example, or a switchgear cabinet having an inverter. The voltage influencing means, in particular the voltage influencing wind power installation or the voltage influencing switchgear cabinet, therefore operates such that a voltage is influenced, that is to say in particular controlled or regulated. Such a voltage influencing means accordingly does not result in the current being influenced. At any rate, a stipulation of current comes second to a stipulation of voltage. The voltage influencing means provides an energy generation grid voltage, that is to say the voltage that predominates in the energy generation grid or at least is present at the output of this voltage influencing means or at a chosen reference point. In the case of a wind farm, this turn generation grid voltage corresponds to a wind farm grid voltage.

Furthermore, there is provision for an initial supply device or means, which is in particular in the form of a current-influencing device or wind power installation or in the form of a switchgear cabinet having an inverter, that initially synchronizes to the energy generation grid voltage provided by the voltage influencing means. This initial supply means is thus oriented to the energy generation grid voltage that has essentially been provided by voltage influencing means. In particular, this energy generation grid voltage has a frequency to which the initial supply means synchronizes. The initial supply means in this case in particular delivers a current whose frequency is in sync with the frequency of the energy generation grid voltage.

The voltage influencing means and the initial supply means now interact in such a way, or are geared to one another in such a way, that they, that is to say the voltage influencing means and the initial supply means, in total provide an electrical power in the energy generation grid, namely at the level of an inherent need of the energy generation grid. An inherent need of this kind relates in particular to the power needed for starting the energy generation grid, that is to say in particular a power such as is needed in the case of a wind farm for starting the wind energy installation of the wind farm.

The energy generation grid thus starts by selecting the establishment mode, in which at least one voltage influencing means and one initial supply means are operated together, each of which independently has a specific task. The voltage influencing means first of all provides a voltage, namely the energy generation grid voltage, and the initial supply means orients itself thereto, adjusts itself thereto and in particular provides a current for supplying power to the energy generation grid. The initial supply means thus takes on the initial supply. The voltage influencing means can alternatively provide a component of this, that is to say can also provide power. The main task of the voltage influencing means, however, is to influence the energy generation grid voltage.

According to one embodiment, it is proposed that the at least one voltage influencing means provides the energy generation grid voltage substantially without power. In this case, there is in particular provision for a split such that the initial supply means provides the necessary power for starting the energy generation grid while the one or more voltage influencing means influence the voltage and provide the initial supply means with an appropriate orientation or reference variable.

Preferably, the at least one voltage influencing means therefore operates in a voltage influencing manner to provide the energy regulates grid voltage. In particular, the voltage influencing means operates such that it regulates to an output voltage, namely the energy generation grid voltage that it thus provides. This also involves influencing a frequency, namely the frequency of the voltage. The voltage influencing means impresses a voltage having predetermined frequency and phase.

According to one embodiment, it is proposed that the at least one initial supply means operates in a current influencing manner to provide an electrical power in the energy generation grid. The initial supply means therefore provides a current or supplies a current to the energy generation grid and in particular corrects said current and influences it as a result. This means that the voltage influencing means and the initial supply means can interact well because each has its own specific task.

According to one embodiment, it is proposed that the at least one voltage influencing means is based on at least one first droop and the at least one initial supply means is based on at least one second droop, wherein each droop describes a respective relationship, particularly a linear relationship, between a voltage of the energy generation grid and a reactive power that is to be supplied or that has been supplied or between a frequency of the energy generation grid and a real power that is to be supplied or has been supplied, and the first droop has a smaller gradient than the second droop.

The voltage influencing means and the initial supply means are therefore each characterized by the respective droop. The respective droop can to this end be implemented in the voltage influencing means and the initial supply means. The voltage influencing means and the initial supply means therefore have the droop—there may also be several.

To this end, it is proposed that the first droop has a smaller gradient than the second droop. This is proposed for both variants of the droops. In particular, each droop describes a linear relationship. The gradient therefore relates to the characteristic of the reactive power in relation to the voltage, regardless of whether the reactive power or the voltage forms an input variable for control engineering purposes. The same applies for the relationship between real power and frequency, in the case of which the gradient relates to the characteristic of the real power in relation to the frequency, also independently of whether the real power or the frequency forms an input variable for control engineering purposes.

The gradients of the droops can each stipulate operating points. The lower gradient in each case for the droop of the voltage influencing means leads to the voltage influencing means in the steady state supplying less reactive power in comparison with the initial supply means for the same voltage, and the voltage influencing means supplying less real power in comparison with the initial supply means for the same frequency.

Preferably, it is proposed that
  the at least one voltage influencing means is based on a first reactive power droop describing a relationship between a voltage to be provided by the voltage influencing means in the energy generation grid and a reactive power supplied by the voltage influencing means, and
  the at least one initial supply means is based on a second reactive power droop describing a relationship between a voltage recorded in the energy generation grid and a reactive power to be supplied by the initial supply means, and the first reactive power droop has a smaller gradient than the second reactive power droop, and/or in that the at least one voltage influencing means is based on a first real power droop describing a relationship between a frequency to be provided in the energy generation grid by the voltage influencing means and a real power supplied by the voltage influencing means, and the at least one initial supply means is based on a second real power droop describing a relationship between a frequency recorded in the energy generation grid and a real power to be supplied by the initial supply means, and the first real power droop has a smaller gradient than the second real power droop.

Both the reactive power droop and the real power droop can each be a droop as described generally above. There may also be provision for in each case a reactive power droop and a real power droop to be taken as a basis and hence implemented. Each droop relates in each case to a voltage influencing means, or an initial supply means. If there are multiple voltage influencing means or initial supply means, each has its own droop, or droops, which may be the same for all voltage influencing means in each case and/or for all initial supply means in each case. Each voltage influencing means or initial supply means considers the reactive power and/or real power supplied by itself. To this end, its real and/or reactive power is preferably recorded.

According to one embodiment, it is proposed that:

the at least one voltage influencing means provides the voltage that is to be provided on the basis of the supplied reactive power in each case according to the first reactive power characteristic curve, and the at least one initial supply means supplies the reactive power that is to be supplied on the basis of the recorded voltage in each case according to the second reactive power droop and/or the at least one voltage influencing means provides the frequency that is to be provided on the basis of the supplied real power in each case according to the first real power droop, and the at least one initial supply means supplies the real power that is to be supplied on the basis of the recorded frequency in each case according to the second real power droop.

For the voltage influencing means, on the one hand, and the initial supply means, on the other hand, which are in current influencing form to be exact, the droops therefore have different significance, at least for the control engineering implementation.

The voltage influencing means sets its output voltage on the basis of the recorded reactive power, and sets its frequency, namely the frequency of its output voltage, on the basis of the recorded real power. Reactive power and real power are the input variables in this case.

The initial supply means sets its reactive power on the basis of the voltage and its real power on the basis of the frequency. In this case, the voltage and the frequency thus form the input variables. The droops with their gradients always relate to the reactive power with reference to the voltage and to the real power with reference to the frequency, however. The voltage taken as a basis is particularly a voltage deviation, namely a deviation in the voltage from a voltage taken as a basis as a reference value, for example a grid rated voltage.

A droop such as describes the relationship between voltage and reactive power or between frequency and real power is also referred to among experts as droop. It relates in particular to a voltage deviation between setpoint voltage and actual voltage, in this case in particular referenced to the energy generation grid, and hence fundamentally to the energy generation grid voltage. In this respect, this droop can also be regarded as a P controller, the initial supply means resulting in a reactive power or additional reactive power, in proportion to the voltage deviation, being provided or being supplied to the energy generation grid.

Similarly, this droop describing the relationship between frequency and real power can likewise be regarded as a P controller, the initial supply means providing or supplying to the energy generation grid a real power or additional real power in proportion to the frequency deviation.

The opposite applies in each case for the voltage influencing means.

If the droop is not just linear, there can be a linear component, however. This can also be referred to as a P component in the controller or can be regarded as such if there are further components. The P component can thus then describe the gradient.

Preferably, the gradient or gain of the second droop, second reactive power droop and/or second real power droop is at least twice as great, in particular at least three times as great, as the gradient or gain of the corresponding first droop, reactive power droop and real power droop. In this case, it is particularly crucial that the first gradient is significantly greater than the second gradient. The droops are therefore geared to one another such that the at least one initial supply means substantially takes on the supply of reactive and/or real power vis-à-vis the voltage influencing means. The voltage influencing means takes on the first provision of voltage in this case, while the initial supply means takes on the initial supply for the power and reactive power.

A voltage influencing means can be for example a voltage influencing inverter, and the initial supply means can be a current influencing inverter. These are for the most part each accommodated in a switchgear cabinet, so that a voltage influencing switchgear cabinet and a current influencing switchgear cabinet are also used as terms for the purpose of simplification. There is alternatively the possibility of other units, such as for example an analogously operating supply unit. It is also possible for at least one voltage influencing means and an initial supply means to be accommodated together in one unit, e.g., in a wind power installation.

For the purposes of illustration and just by way of example, an operating principle is explained below for a voltage influencing inverter and a current influencing inverter without being restricted thereto.

Fundamentally, a voltage influencing inverter operates by providing an output voltage at its output according to amplitude, frequency and phase. A feedback loop is used to feed back the instantaneous value of the output voltage. A voltage signal is therefore fed back. It is possible by way of example for a tolerance band method to be used, which involves continually checking, that is to say at the sampling rate used, whether the fed-back voltage signal is in a tolerance band. As soon as the voltage signal hits a limit of the tolerance band, the inverter switches in order to keep the signal in the tolerance band.

In this case, the tolerance band is an implementation of a setpoint value for the output voltage of the inverter. The setpoint value is prescribed as a setpoint signal, namely also according to amplitude, frequency and phase, and the tolerance band is fundamentally situated closely around this setpoint signal with an upper and a lower band limit.

If a sudden change in reactive power now occurs, which involves the reactive power in the energy generation grid changing abruptly or at least quickly, for example because a capacitively acting element has been connected, such as for example a transmission line, then the voltage influencing inverter also witnesses a change in its delivered and hence supplied reactive current. The reason for this is that the voltage influencing inverter, similarly to a voltage source, attempts to keep its output voltage constant, so that an altered current is obtained for approximately the same voltage.

This then furthermore leads to a new voltage setpoint value being set according to a reactive power droop stored for this voltage influencing inverter. The output voltage then changes in accordance with the new voltage setpoint value.

A voltage deviation can arise between the voltage of the energy generation grid and a setpoint value, which is called a grid setpoint voltage in this case. This grid setpoint voltage and hence this voltage deviation relates not to the instantaneous value of the output voltage, but rather to an RMS value or other characteristic value of the voltage amplitude.

The current influencing inverter initially operates quite similarly to the voltage influencing inverter, only that instead of instantaneous values of an output voltage, instantaneous values of an output current are fed back. An output current signal is thus fed back. If the reactive power in the energy generation grid changes, this does not initially have a severe immediate effect on the output current, because the output current is regulated. The current influencing inverter thus operates in the manner of a current source.

The altered total reactive power therefore initially has an effect only for the voltage influencing inverter.

However, the current influencing inverter detects the voltage deviation that the voltage influencing inverter has caused owing to the reactive power current. A reactive power setpoint value is then ascertained for the current influencing inverter on the basis of this voltage deviation and according to its reactive power droop, and this is taken as a basis for determining a setpoint current signal for the output current, which the current influencing inverter then supplies.

Thus, the reactive current of the current influencing inverter then also changes and the current influencing inverter consequently takes on a large portion of the reactive current of the voltage influencing inverter, and this again leads to adaptation of the output voltage there according to the reactive power droop. The two inverters—there may also be more—then adjust themselves on the basis of their reactive power droops to a stable operating point that has the same voltage deviation. Owing to the different gradients of the reactive power droops, the current influencing inverter then supplies more reactive current or reactive power than the voltage influencing inverter.

In the event of a sudden change in reactive power, the voltage influencing inverter therefore reacts immediately and adapts its voltage, which leads to a reaction from the current influencing inverter, which therefore initially supplies the reactive power. The two, or more, inverters then adopt an operating point at which the current influencing inverter then substantially, at least to a greater extent, takes on the supply of reactive power owing to the proposed selection of the reactive power droop.

The system also operates in a similar manner in the event of a sudden change in real power or a fast change in real power. All in all, a real current changes, but with initially only the current of the voltage influencing inverter changing. This change in its real current is recorded by the voltage influencing inverter and, according to its real power droop, leads to a new setpoint value for its voltage signal, namely at an altered frequency.

Next, the current influencing inverter records this frequency change and appropriate real power setpoint values are generated for the current influencing inverter. Owing to the greater gradient of the droop or gain in the real power droop of the current influencing inverter, the latter will assume a greater real power value than the voltage influencing inverter for the same frequency. Both inverters then supply corresponding real power, with the current influencing inverter supplying the greater portion.

The described reactions to a sudden change in reactive power and a sudden change in real power can also take place together.

According to one embodiment, it is proposed that the selecting of the establishment mode, in particular changing from the normal operating mode to the establishment mode, is effected or else can be effected when additionally the energy generation grid has a voltage drop. Accordingly, it is proposed to consider not only a voltage drop in the electrical supply grid but also a voltage drop in the energy generation grid. Particularly if the voltage drops, that is to say in particular voltage dips, are already significant in one of the two grids, it is possible for the selecting of the establishment mode or the changing thereto to be proposed. If the respective voltage drop is small, there is also the possibility of the energy generation grid additionally needing to have a voltage drop in order to select the establishment mode or to change to this establishment mode.

According to one embodiment, it is proposed that the operating of the energy generation grid in the establishment mode is effected only when the energy generation grid is de-energized. As a result, the effect that can be achieved is that the establishment mode can begin from the beginning without needing to take account of an existing voltage according to frequency and/or phase and/or amplitude. As a result, the effect that can be achieved is that solely the at least one voltage influencing means and the at least one first supply device or means guide the establishment mode.

In particular, it is also proposed in this regard that the energy generation grid is isolated from the electrical supply grid, so that the energy generation grid can start up independently and without interference.

According to one configuration, it is proposed that the at least one initial supply means and the further initial supply device or means are synchronized in cascaded fashion to provide the electrical power in the energy generation grid. The synchronization thus takes place gradually by virtue of a first initial supply means being synchronized to the voltage influencing means and in that case also already providing electric current or supplying electric current to the energy generation grid. This first minimal system comprising at least one voltage influencing means and one initial supply means is then synchronized to by the next initial supply device or means, where present.

According to a further configuration, it is proposed that the electrical power provided by the at least one initial supply means in the energy generation grid has at least one reactive power component that is sufficiently large to cover the reactive power requirement of the energy generation grid. In particular electrical lines in the energy generation grid, but also inductive loads, mean that there can be a power requirement in the energy generation grid. This is covered in the establishment mode, according to this embodiment, by the at least one initial supply means. Accordingly, a minimum requirement for the size of the at least one initial supply means also arises. The at least one initial supply means or the multiple initial supply devices or means, when several are used, must accordingly be able to provide as much reactive power as the energy generation grid needs.

Preferably, the method is characterized in that the electrical power provided by the at least one initial supply means in the energy generation grid has at least one reactive power component and one real power component. For this, it is proposed that the reactive power component is greater than the real power component, preferably at least twice as great, more preferably particularly at least five times as great. It is therefore proposed that the reactive power component is significantly higher than the real power component. In this case, it has been recognized that initially the coverage of a need for reactive power is in the foreground in this establishment mode and that any loads needing real power may initially not be actuated in the establishment mode. At any rate at the beginning of the establishment mode, the reactive power can be in the foreground. Any loads for real power may then initially need to be shut down or remain shut down. As a result, the effect that can be achieved is that initially as many generators as possible are connected to the grid in order to establish the grid.

Preferably, the energy generation grid voltage is ramped up to the supply grid voltage in order to synchronize the energy generation grid to the electrical supply grid. In this case, the supply grid voltage is the voltage that the electrical supply grid has. In particular, the energy generation grid can be connected to the electrical supply grid again in order to restore the normal operating mode after the energy generation grid is in sync with the electrical supply grid.

According to one embodiment, it is therefore proposed that the energy generation grid is connected to the electrical supply grid via an energy generation grid transformer if the energy generation grid has an energy generation grid voltage synchronized to the electrical supply grid. Such an energy generation grid transformer is in particular a wind farm transformer if the energy generation grid is a farm grid of a wind farm. The wind farm transformer can also be referred to synonymously as a farm transformer.

Alternatively, the connecting of the energy generation grid to the electrical supply grid can also be effected when the electrical supply grid has no voltage. In this case, a grid reestablishment voltage can be provided at the grid connection point. The electrical supply grid can thus be started up by the energy generation grid.

According to one embodiment, it is proposed that the at least one voltage influencing means and the at least one initial supply means are ramped down, so that the energy generation grid is de-energized when the electrical supply grid has a voltage drop. When the electrical supply grid has a voltage drop, that is to say has operated normally beforehand and the normal operating mode was present beforehand, the energy generation grid can initially be ramped down in order to get the energy generation grid de-energized. Preferably, the energy generation grid is started only when rectification of the voltage drop in the electrical supply grid can also be expected or rectification of a fault that led to the voltage drop can be expected.

According to one embodiment, it is also proposed that the at least one voltage influencing means provides an energy generation grid voltage only when the energy generation grid is de-energized. The energy generation grid is thus initially ramped down, or it is detected that it is ramped down, and only then does the first step of the establishment mode begin, namely providing an energy generation grid voltage by means of the voltage influencing means.

Various definitions are proposed for the voltage drop that relate to the rated voltage of the electrical supply grid. In regard to the rated voltage of the electrical supply grid, it is proposed for this that the voltage of the electrical supply grid is less than 90%, less than 70%, less than 30% or less than 10% of the rated voltage. At a value of less than 90%, there is already a significant voltage drop. In particular in order to detect the voltage drop as a fault even more clearly, a value of less than 70% of the rated voltage can be proposed. A value of less than 30% of the rated voltage is detectable even more clearly and better, and it becomes clear that in this case there is a fault that also necessitates establishment of the energy generation grid. The use of a value of less than 10% to define this voltage drop becomes even clearer. Since, during normal operation, the voltage of the electrical supply grid is at approximately rated voltage, in the event of a voltage drop it will also be reduced through the values of 90%, 70% and 30% to 10% if it does not recover beforehand. The definition of these different values can therefore also result in at least small time differences in the detection if the voltage does not recover. Preferably, a voltage drop comprises or is a drop in the voltage to the value zero.

According to one embodiment, it is proposed that the at least one voltage influencing means has a DC link circuit fed from a capacitance to provide the energy generation grid voltage. In this regard, it is proposed that the capacitance is configured to supply the DC link circuit with a DC voltage in the event of a voltage drop in the electrical supply grid or in the event of a de-energized energy generation grid such that the at least one voltage influencing means can provide a stable energy generation grid voltage. The capacitance or a corresponding capacitor unit or capacitor bank therefore provides a sufficiently high DC voltage. In particular an inverter can be used to generate and provide a voltage therefrom in the energy generation grid.

For this, the inverter can be actuated using what is known as a pulse width modulation method, for example. There is also the possibility of using a tolerance band method. When the tolerance band method is used, it is particularly proposed that a voltage is fed back at the output of an output inductor connected up to the inverter as an actual voltage for the tolerance band method. At any rate, such or a similar method can provide the necessary voltage in the energy generation grid in a stable manner. The capacitance, or the capacitor means or the capacitor bank, can in particular be fed by a rectifier connected to a generator, for example of a wind power installation.

According to one embodiment, it is proposed that a voltage drop in the electrical supply grid is recorded and/or a loss of voltage in the energy generation grid is detected, with a voltage recording of the at least one voltage influencing means being proposed for this. The voltage influencing means can therefore independently and immediately detect the voltage drop or the loss of voltage and switch to the establishment mode and perform a first important step for starting the energy generation grid.

According to one embodiment, it is proposed that the energy generation grid comprises a power controller by means of which the at least one initial supply means supplies an electrical power to the electrical supply grid on the basis of a power setpoint value. Such a power controller for the energy generation grid, which can be in the form of a farm controller or central farm controller of a wind farm, for example, can therefore be used to coordinate the supplied or provided power. To this end, there is also the possibility of such a power controller receiving a setpoint value or a target value externally, such as for example from a grid operator of the electrical supply grid. Particularly in the event of grid reestablishment, this allows coordination with connection or power-up of electrical loads in the electrical supply grid to be performed. Such coordination could also already be performed within the energy generation grid.

Preferably, a power setpoint value is prescribed by an energy generation grid operator or by a grid operator of the electrical supply grid in this case. As a result, particularly the grid operator of the electrical supply grid has the opportunity to use such a setpoint value to have a controlling effect on the energy generation grid, but without providing further control details for the energy generation grid.

To this end, the electrical power of the initial supply means is then accordingly increased, that is to say is slowly corrected in the event of a system deviation between its actual value and the prescribed setpoint value, or another setpoint value. Depending on the controller, there may also be provision for a certain remaining system deviation to be accepted. Preferably, however, an I controller or at least an I component in a controller is proposed in order to also correct remaining system deviations, that is to say to achieve steady-state accuracy. Particularly in the case of accordingly high power setpoint values, particularly when further loads are connected or ramped up in the meantime, it is possible for further initial supply means to be connected and used. These can be connected and synchronized in cascaded fashion. It is thus possible for a higher power requirement to be attended to gradually.

Preferably, it is also proposed that the energy generation grid has a frequency stability that holds back a portion of the electrical power of the at least one initial supply means in order to release it, in particular supply it, for the frequency stability of the electrical supply grid when required. In particular, this frequency stability can be provided for or implemented as a control specification, particularly in a central control device of the energy generation grid. In the case of a wind farm, that can therefore be provided for or implemented in a central farm controller or central farm control unit.

The initial supply means can provide electrical power in this case, which describes the power that the initial supply means can make available at that moment. In this respect, this electrical power is an upper limit, at least a temporary upper limit. In the event of the initial supply means being a wind power installation, it can provide as much electrical power as the prevailing wind provides and any other limitations of the wind power installation still permit. Should nominal wind thus prevail, for example, and should there otherwise be no restriction on the wind power installation, then the electrical power of the initial supply means is the rated power of the wind power installation in this case.

It is proposed that a portion thereof be held back, that is to say initially not supplied. By way of example, this can mean that, in the case of the wind power installation described, it will throttle its operation, for example by virtue of its rotor blades being rotated out of the wind in part. However, it can also mean that for example when an energy store is used, said energy store being used to store the portion of the electrical power that is held back, or, if the electrical store forms the power source, only a portion of power available therefrom is actually used in the first place. In the case of the wind power installation cited by way of example, there is also the possibility of said wind power installation generating the power fully available from the wind, within the scope of its limits, but temporarily consuming or destroying the portion that is held back, for example by means of resistors in which the electrical power is deliberately converted into heat. This can be effected particularly by means of a chopper process or a chopper circuit or chopper apparatus, with a portion of the electrical power deliberately being routed to such resistors by choppers, that is to say by controlling a current by means of pulsed actuation, for conversion into heat.

If more power is now needed for frequency stability, it is possible to resort to this held-back portion of the available power. By way of example, it is thus possible for the rotor blades to be adjusted such that more power can be drawn from the wind in order to address this first example. Alternatively, less power can be consumed. In particular, the chopper process described can be altered such that less power is consumed thereby. If need be, the chopper process is suspended or terminated completely in order to use this power for the frequency stability of the energy generation grid.

Preferably, it is also proposed that the frequency stability draws electrical power from the electrical supply grid and preferably consumes it by means of a chopper apparatus. This means that it is possible not just for the supplied power to be decreased or held back, but also for the power to be reduced to an even greater extent for frequency backup control, namely to a negative range. This allows the control range to be extended.

Otherwise, such frequency stability can be coordinated centrally or else implemented by each initial supply means independently. In particular, there can be provision for each initial supply means to implement such frequency stability or the described detail based on a power setpoint value or to implement it based on a frequency measurement. The reason is that it is particularly proposed that the held-back portion of the power is made available again or is taken as a basis for controlling what value the frequency of the voltage in the energy generation grid or in the electrical supply grid has.

Additionally or alternatively, it is proposed that the frequency stability limits supply of electrical power by the at least one initial supply means if the energy generation grid and/or the electrical supply grid has a grid frequency that is an overfrequency. Such an overfrequency is particularly a frequency that is above a normal frequency, in particular nominal frequency, by a predetermined permissible frequency exceedance value. It is then proposed that the supplied of power will be reduced. Accordingly, limitation of the supplied power is proposed.

According to one embodiment, it is proposed that the energy generation grid is configured to receive a weather forecast and/or to produce a weather forecast, wherein the weather forecast is used to stipulate a time at which operation of the energy generation grid in the establishment mode can be started. It is therefore proposed that a weather forecast, particularly if the energy generation grid is a wind farm or has wind power installations as voltage influencing means and/or initial supply means, is taken as a basis for planning the starting of the energy generation grid, particularly operation in the establishment mode.

If sufficient wind can be expected, then the proposed establishment mode can be started and performed. If there is not sufficient wind, then the establishment mode can possibly not be started. However, there is also the possibility of there being sufficient wind but the wind speed being comparatively low, which means that multiple wind power installations are needed as initial supply means, for example, in order to be able to provide sufficient power. Accordingly, there can be provision for the starting of the voltage influencing means, which provides an energy generation grid voltage, to be followed by an appropriate number of wind power installations being started as initial supply means. If need be, there is also the possibility of an appropriate number of voltage influencing means initially being used in order to provide the energy generation grid voltage.

According to one embodiment, it is proposed that the voltage influencing means and the initial supply means each form a supply unit and operate as voltage influencing means or initial supply means by means of actuation, wherein in particular the voltage influencing means can operate as initial supply means by virtue of an appropriate change of actuation and the initial supply means can operate as voltage influencing means by virtue of a change of actuation. In particular, the voltage influencing means and the initial supply means can be the same apart from the actuation. In particular, the energy generation grid can have multiple, in particular substantially identical, supply units provided in it that operate as voltage influencing means or as initial supply means as required. In particular, it is proposed that the energy generation grid is a farm grid of a wind farm and the supply units are wind power installations and each wind power installation can operate as a voltage influencing means or as an initial supply means, depending on actuation. According to this or any other embodiment, there can also be provision for a wind power installation to comprise a voltage influencing means and an initial supply means. By way of example, a voltage influencing means and an initial supply means can each be provided as a switchgear cabinet in the wind power installation, or elsewhere. Preferably, there is provision for a battery store container for this, which additionally has a battery store, for providing electrical power for grid reestablishment.

In particular, the implementation as voltage influencing means or initial supply means can be distinguished in that in the case of the voltage influencing means a voltage actual value is fed back and compared with a voltage setpoint value, in order thereby to regulate the voltage influencing means to the voltage setpoint value, whereas the initial supply means can operate particularly as a current influencing means and a current actual value is fed back and compared with a current setpoint value in order to control the initial supply means on the basis thereof. In particular, the initial supply means is regulated to the current setpoint value. This relates particularly to the respective instantaneous values and less to the RMS values, which are affected only indirectly.

In particular, there is provision for all supply units of the energy generation grid to be able to operate as voltage influencing means or initial supply means, depending on actuation. In particular, it is proposed for a wind farm that all wind power installations of the wind farm can operate as voltage influencing means or as initial supply means, depending on actuation.

A wind power installation is also proposed that has a control unit and a converter configured to operate in voltage-influencing and/or current-influencing fashion. The control unit actuates the converter such that the wind power installation is configured to operate as voltage influencing means or as initial supply means, in particular in a method according to at least one of the embodiments described above.

The wind power installation is therefore prepared, particularly by virtue of appropriate implementation of control in its control unit, to carry out the control and/or method steps or a portion thereof that have been described in connection with the voltage influencing means when the wind power installation operates as voltage influencing means or that have been described for the initial supply means when the wind power installation operates as initial supply means.

A wind farm is also proposed that has at least one first and one second wind power installation, wherein the first wind power installation can operate in voltage-influencing fashion and the second wind power installation can operate in current-influencing fashion, in particular in order to operate as initial supply means. Moreover, this at least one first and one second wind power installation are consequently prepared to carry out a method according to one of the embodiments described above. Alternatively, there is provision for at least one first inverter, which can operate in voltage-influencing fashion, and there is provision for at least one second inverter, which can operate in current-influencing fashion, in order to carry out a method according to one of the embodiments described above.

Preferably, the at least one first and at least one second wind power installation used will be in each case a wind power installation or a wind power installation according to one embodiment.

According to one embodiment, it is proposed that at least one first or the at least one first inverter, which can operate in voltage-influencing fashion, and at least one second or the at least one second inverter, which can operate in current-influencing fashion, are together coupled to an energy storage unit, in particular a battery store, and together form a black starting unit and are prepared to be used to operate the energy generation grid in the establishment mode, in particular such that the energy storage unit provides the at least one first and the at least one second inverter with energy needed to operate the establishment mode.

The at least one first inverter forms the voltage influencing means in this regard and the at least one second inverter forms the initial supply means in this regard. The power that the inverters each need for supplying or providing and the power that they need for their own supply, particularly for control and possibly for communication devices, is provided by the energy storage unit. Preferably, this black starting unit is embodied as a black starting container, so that the inverters and the energy storage unit are accommodated in a container. The use of such a container allows a wind farm that was previously incapable of a black start to be upgraded to a wind farm that is capable of a black start in a simple manner. The black starting container only needs to be connected to the farm grid of the wind farm, and if need be a communication device or communication interface for communication with a central farm controller or central farm control unit is also installed.

BRIEF DESCRIPTION OF THE SEVERAL VIEWS OF THE DRAWINGS

The invention is now explained more specifically below in exemplary fashion with reference to the accompanying figures.

DETAILED DESCRIPTION

Figure 1:
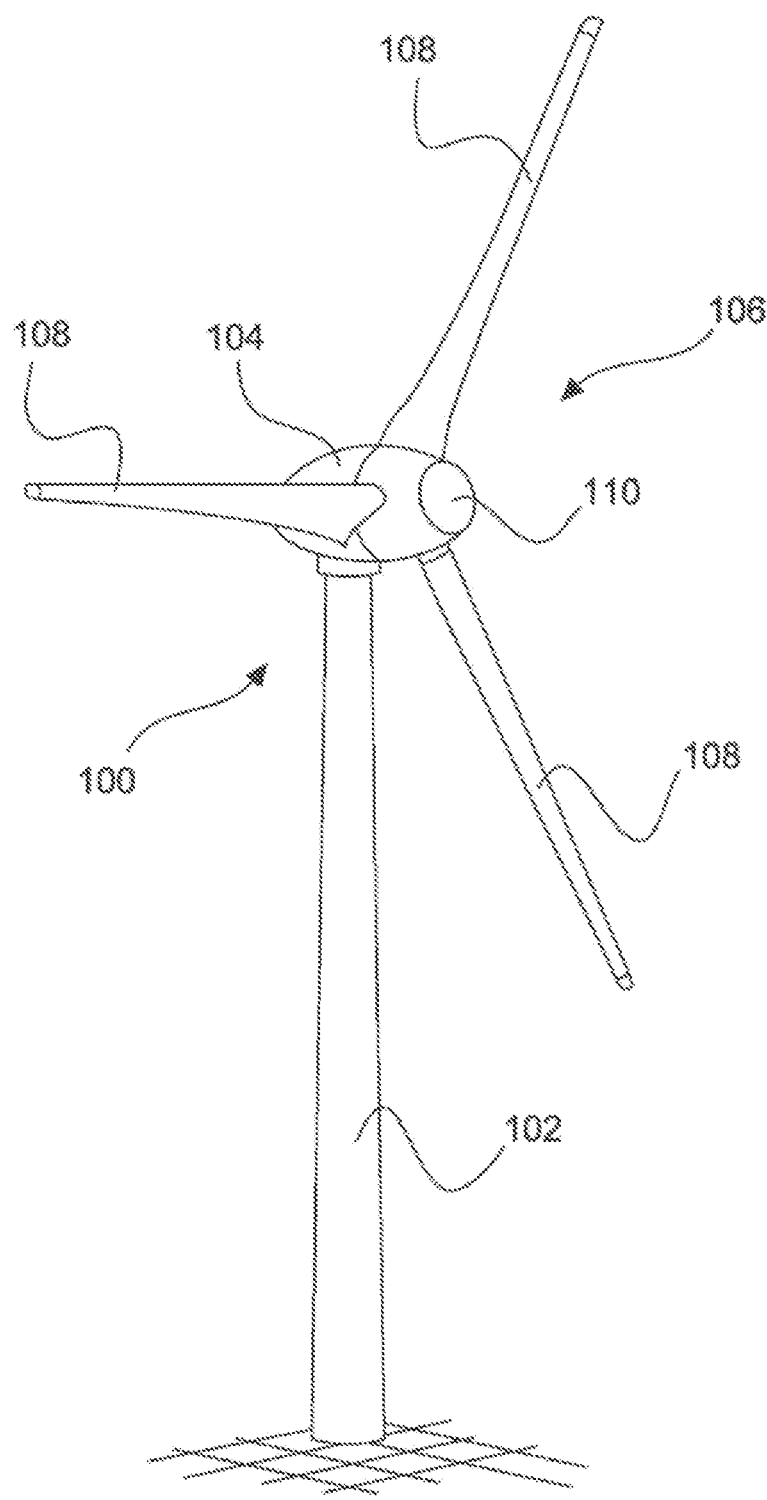
FIG. 1 schematically shows a wind power installation in a perspective depiction.

FIG. 1 shows a wind power installation 100 having a tower 102 and a nacelle 104. The nacelle 104 has a rotor 106 arranged on it having three rotor blades 108 and a spinner 110. The rotor 106 is set in a rotary motion by the wind during operation and thereby drives a generator in the nacelle 104.

Figure 2:
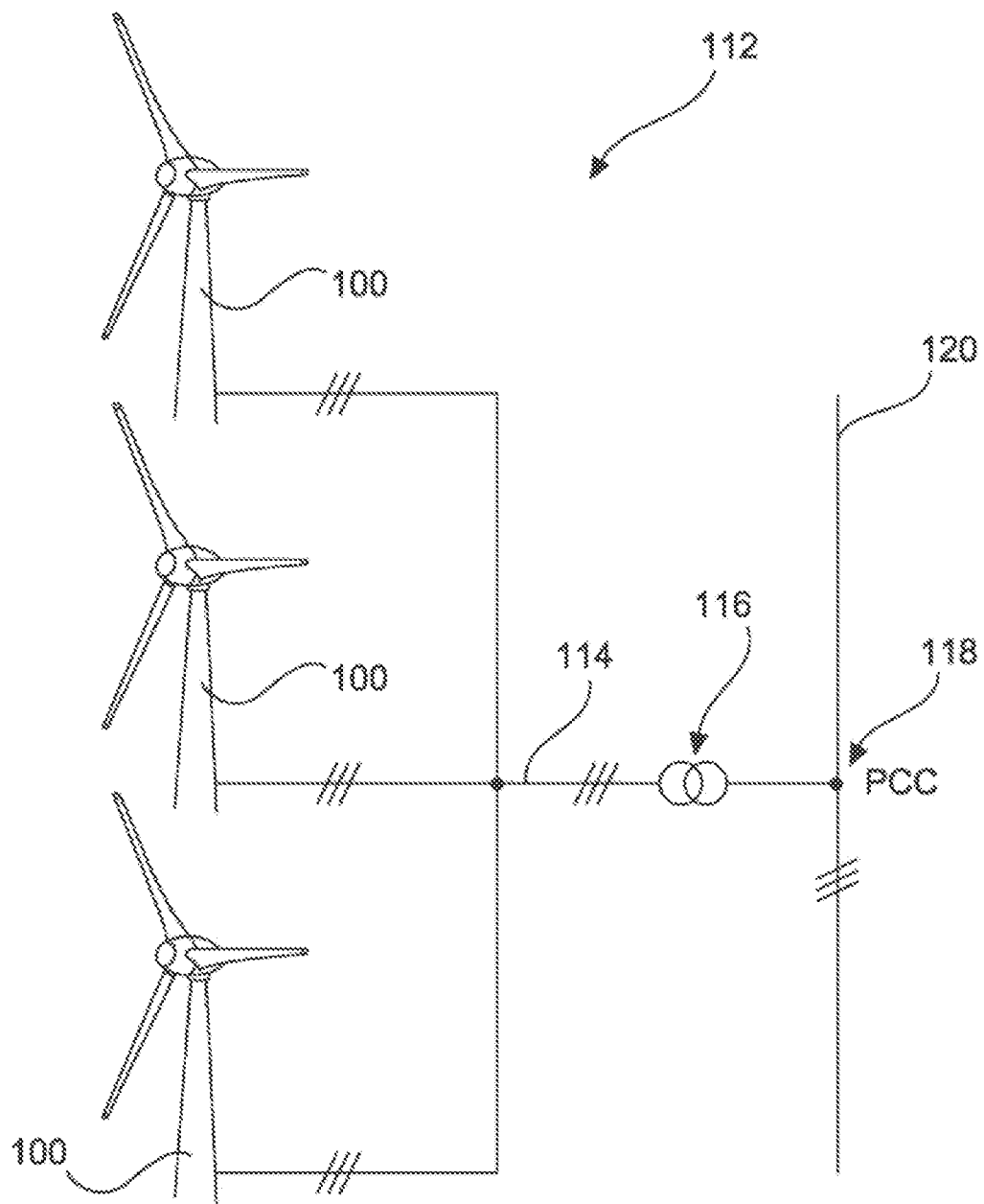
FIG. 2 shows a wind farm in a schematic depiction.

FIG. 2 shows a wind farm 112 having, in exemplary fashion, three wind power installations 100, which can be identical or different. The three wind power installations 100 are therefore representative of basically an arbitrary number of wind power installations of a wind farm 112. The wind power installations 100 provide their power, namely in particular the generated current, via an electrical farm grid 114. In this case, the respectively generated currents and powers of the individual wind power installations 100 are added up and for the most part there is provision for a transformer 116 that steps up the voltage in the farm so as then to supply to the supply grid 120 at the supply point 118, also referred to generally as a PCC. FIG. 2 is only a simplified depiction of a wind farm 112 that does not show a controller, for example, even though a controller is naturally present. It is also possible for the farm grid 114 to be of different design, for example, by virtue of there also being a transformer at the output of each wind power installation 100, for example, to cite just one other exemplary embodiment.

Figure 3:
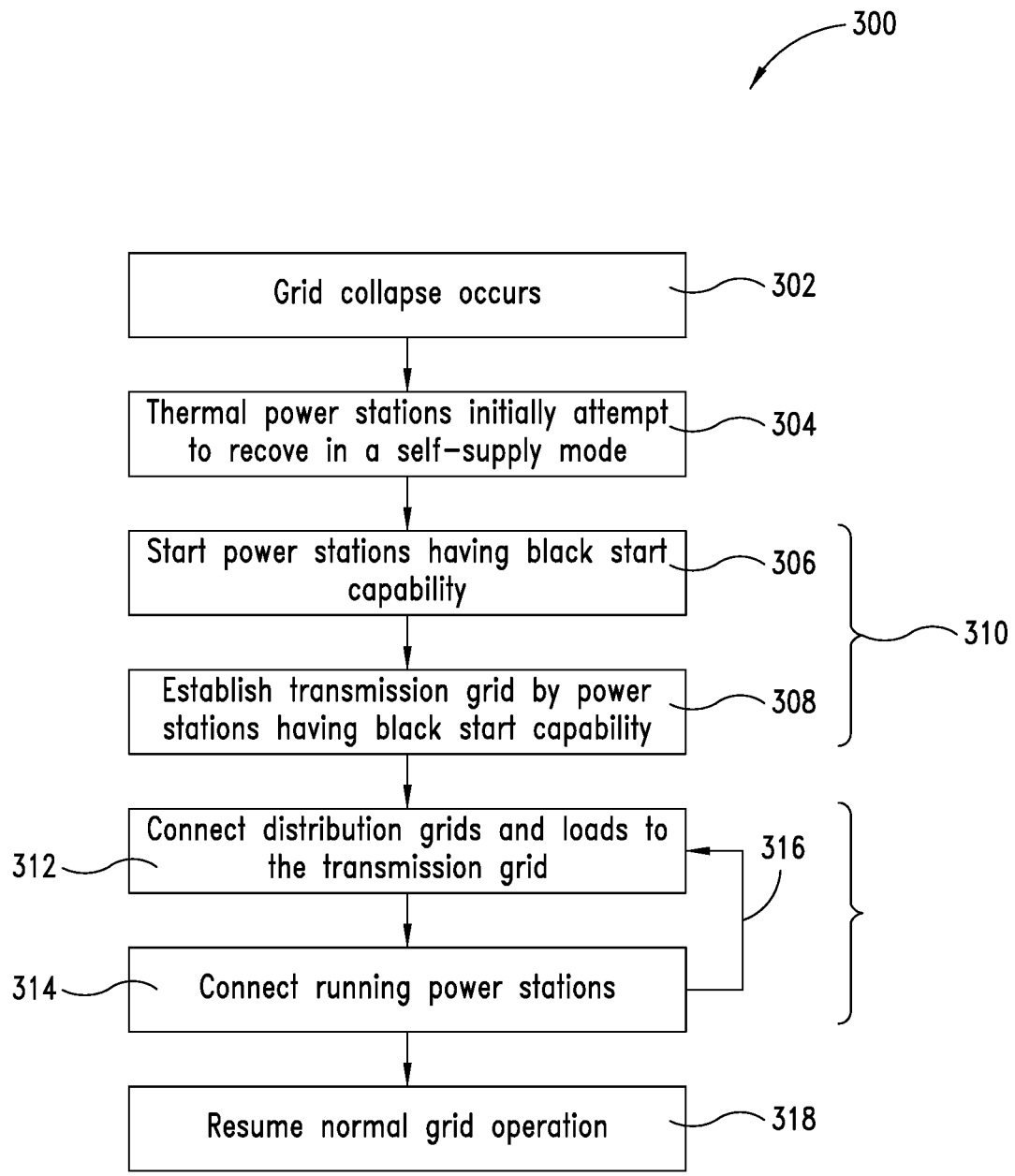
FIG. 3 shows a conventional sequence for a black start and grid reestablishment after a grid collapse.

FIG. 3 illustrates a conventional sequence from a grid collapse via reestablishment back to normal grid operation. This sequence 300 begins in block 302 with a grid collapse, when the electrical supply grid collapses. This particularly leads to safety switches being opened and power stations no longer being able to deliver their power to the electrical supply grid. Accordingly, block 304 explains that, following the grid collapse, thermal power stations initially attempt to recover in a self-supply mode. They thus attempt to decrease their power generation as quickly as possible, but preferably to remain in operation. If possible, they are supposed to recover in the mode of self-supply by still generating as much energy as they need for their own supply.

Then, but particularly after it has been possible to correct an applicable fault in the grid or at least the electrical supply grid or a portion thereof is fundamentally ready for operation, starting of power stations having black start capability is carried out. This starting of the power stations having black start capability is illustrated in the next block 306. Power stations having black start capability are in particular power stations that are able to start themselves without an external supply of electrical energy and that are also capable of operating a section of the electrical supply grid at least to a small extent. In this context, to a small extent can also mean that some loads of the applicable section are initially not yet connected.

Based on the starting of such power stations having black start capability, a transmission grid is accordingly also established by these power stations having black start capability, this being illustrated by block 308. Blocks 306 and 308 therefore describe a black start of the electrical supply grid or a portion thereof, and this regularly requires two to four power stations having black start capability. These two blocks 306 and 308 can be combined as black start steps 310.

In block 312, the next step is that distribution grids and loads are connected to the transmission grid. A further step, proposed in block 314, is connecting power stations running so as to cover their own need. From block 314, it is possible to return to block 312 and for a loop to be executed in this manner, in which distribution grids and loads are gradually connected to the transmission grid and power stations running so as to cover their own need are connected. This loop 316, which essentially consists of these two blocks 312 and 314, can also be referred to as grid reestablishment. In this grid reestablishment, the entire power station farm is thus reestablished. This power station farm can denote the electrical supply grid with all the connected power stations.

Once this grid establishment according to loop 316 has then been completed successfully, normal grid operation can then be resumed in the last step according to block 318.

Figure 4A:
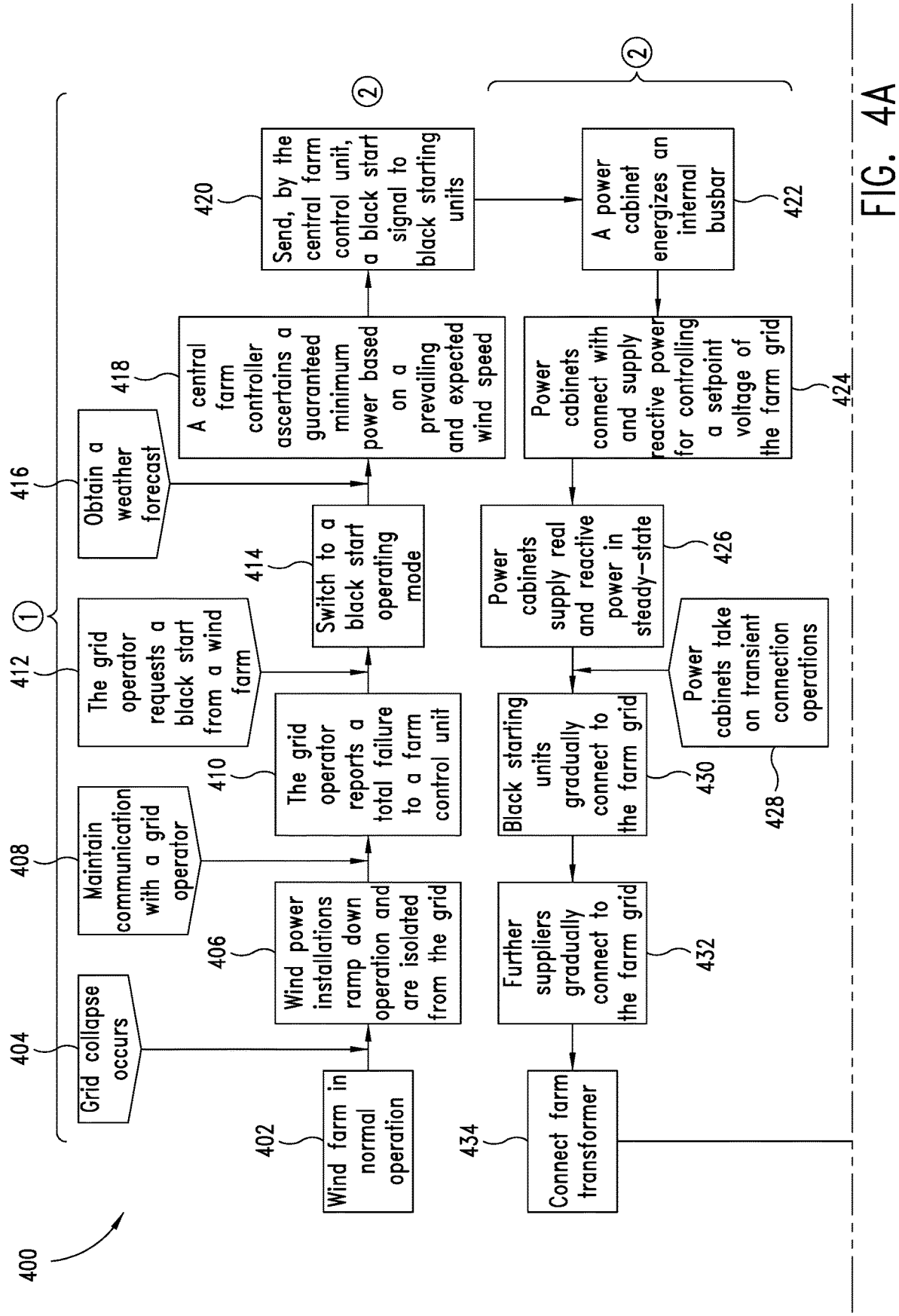
FIGS. 4A and 4B show a proposed sequence for a start and reestablishment after a grid collapse.
Figure 4B:
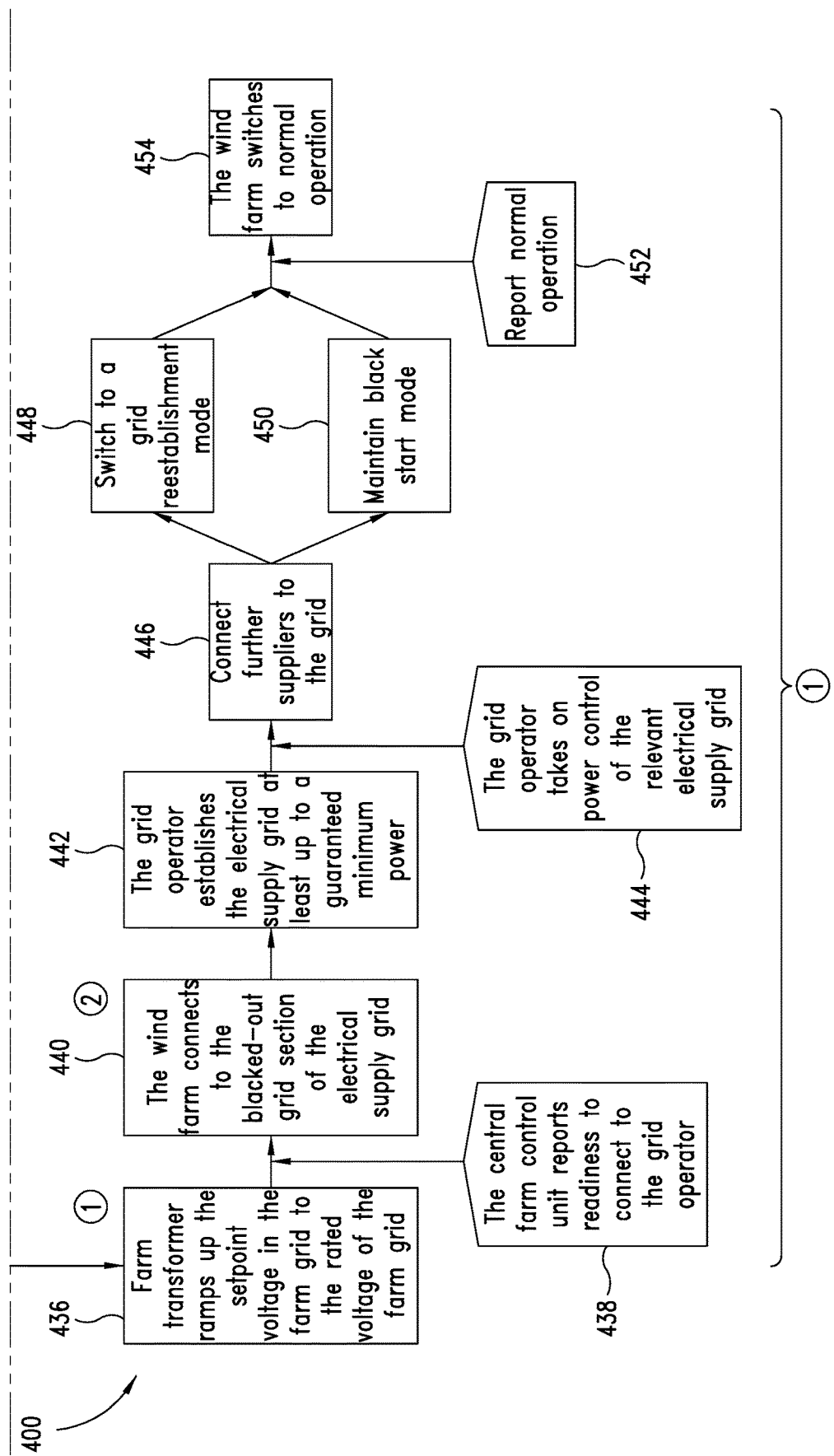

An alternative sequence 400 to the sequence of FIG. 3 is depicted in FIGS. 4A and 4B. This sequence 400 describes the sequence for a wind farm, that is to say which steps occur in a wind farm, are relevant to it or need to be taken into consideration.

This sequence 400 sets out from a starting state according to block 402, which the wind farm is in during normal operation. Essentially, power is supplied to the electrical supply grid in this case on the basis of wind speed, preferably as much as can be drawn from the wind. A grid collapse then occurs according to block 404. The wind power installations of the wind farm then ramp down their operation in a defined manner and isolate themselves from the grid. This is illustrated by block 406. The communication by the wind power installations particularly with a central farm controller is maintained as far as possible. During this ramping down according to block 406, the wind power installations can drop into a self-supply mode, in which they generate as much energy as they themselves need for their operation. Similarly, the wind farm as a whole can drop into a self-supply mode, in which the wind power installations generate as much energy as the wind farm as a whole needs to maintain its functionality. If a self-supply mode is not used, the communication can be maintained by means of an energy store, for example.

A central farm controller, particularly one supplied with power by an uninterruptable power supply, also maintains its communication with a grid operator. At least it maintains a communication capability therewith, as denoted by block 408.

As the next step, the grid operator, which thus operates the electrical supply grid, then reports a total failure to the farm control unit, and this is represented by block 410. Thus, it is then clear to the wind farm, namely particularly to the central farm controller, that there is a total failure, which means that the wind farm or the central farm control unit can adjust itself thereto.

If applicable faults in the electrical supply grid have been corrected or the grid operator believes for other reasons that it is now possible for the electrical supply grid to be started, the grid operator makes a black start request to the wind farm, particularly to the central farm control unit, as represented by block 412. The wind farm or the central farm control unit then changes to a black start operating mode according to block 414. This can also be referred to as establishment mode. The blocks from block 406 to block 412 can alternatively also already be considered part of such an establishment mode.

Next, according to block 416, it is then proposed that a weather forecast be obtained or made. Based on that, according to block 418, the central farm controller ascertains a guaranteed minimum power that it can provide briefly on the basis of the prevailing and expected wind speed. This guaranteed minimum power is also reported to the grid operator.

As the next step, it is proposed according to block 420 that the central farm control unit provides black starting units with a black start signal. For the black starting units, which may possibly even be a single one, such a black start signal means that they perform the respective steps for carrying out a black start. Black starting units can be wind power installations or else units having batteries. In any case, they contain a converter or inverter. A black starting unit can be a voltage influencing means and an initial supply means in each case. By way of example, one wind power installation can operate as voltage influencing means and a further wind power installation can operate as initial supply means. There is also the possibility of one or more power cabinets operating as voltage influencing means or initial supply means in each case. These can both or each be in one wind power installation and obtain energy therefrom. Alternatively, it is proposed that specific power cabinets are fundamentally supplied with power via an energy store, such as for example a battery, independently of a wind power installation. Although such a battery or other energy store can be charged in the wind farm by means of energy from the wind power installations, namely when the wind farm and hence the electrical supply grid are actually operating in a normal mode, it is otherwise not necessary for there to be a relationship between such a battery or other energy store and wind power installations in the wind farm. Alternatively, there is also the possibility of such a battery or other energy store being accommodated by a wind power installation or in a wind power installation and the wind power installation making its inverters or converters, that is to say its power cabinets or some of these, available for a black start together with such a battery or other energy store.

The next step according to block 422 initially provides for a voltage influencing means, particularly a voltage influencing power cabinet, to energize an internal busbar. The voltage amplitude initially provided for can be a low voltage, so that the voltage influencing means can provide 10% of a rated voltage of the energy generation grid. This can also mean that the busbar is initially also brought only to approximately 10% of its voltage in the normal operating mode. Such voltage influencing means, in particular these voltage influencing power cabinets, then thus keep as constant a voltage as possible. However, they supply comparatively little real power and also little reactive power to the farm grid of the wind farm in this case.

Next, initial supply means and hence current influencing means or current influencing power cabinets will connect, and they supply reactive power for controlling the setpoint voltage to the farm grid. This is represented by block 424. The level of voltage intended to be supported by this supply of reactive power is oriented to the setpoint voltage that the voltage influencing power cabinet provides according to block 422.

The voltage influencing means and current influencing means or voltage influencing power cabinets and current influencing power cabinets are then coordinated according to block 426, or have accordingly different closed-loop control systems, such that the current influencing power cabinets take on the supply of real and reactive power in the steady-state case. Idealistically, the voltage influencing power cabinet supplies neither real nor reactive power each time.

Block 428, however, represents the voltage influencing power cabinets taking on transient connection operations. They thus initially equalize sudden changes in power as a result of connection operations. The current influencing power cabinets then again take on the necessary supply of reactive power and possibly real power, however.

According to block 430, black starting units gradually connect to the farm grid. This relates particularly to voltage influencing power cabinets and current influencing power cabinets, which are thus able to provide a setpoint voltage in the farm grid and possibly also to increase it further. A black starting unit comprises at least one voltage influencing means and one initial supply means and can be in the form of a black starting container, for example, that contains such units and possibly also an energy store that provides energy required for starting.

According to block 432, further suppliers are then gradually connected to the farm grid. These suppliers can also supply reactive power using a particularly high gain, in order to support the setpoint voltage. Such suppliers can be in particular current influencing means, that is to say in particular current influencing power cabinets. In particular, according to block 432, further suppliers are intended to be connected, however, which are not necessarily suited, by means of particular properties, to starting the energy generation grid so that preferably the entire farm can be involved. Thus, according to block 432, essentially the other, normal suppliers are connected.

If sufficient, preferably all, suppliers in the wind farm are then connected to the farm grid, the farm transformer can be connected in the next step according to block 434. The farm transformer, that is to say the transformer via which the farm grid supplies to the electrical supply grid or via which energy is exchanged with the electrical supply grid and the wind farm, is connected to the farm grid according to this step of block 434. In this case, the farm transformer has one side connected to the farm grid but the other side not yet connected to the electrical supply grid.

This connected farm transformer is then used in the next step according to block 436 to ramp up the setpoint voltage in the farm grid to the rated voltage of the farm grid. Such a ramping-up functionality of the farm transformer can also be dispensed with, however. When this process is complete, that is to say that the farm grid has the rated voltage, it is proposed that the central farm control unit reports its readiness to connect to the grid operator, as denoted by block 438.

If the grid operator is in agreement, at least does not prohibit connection, the wind farm connects to the blacked-out grid section of the electrical supply grid in the next step according to block 440. The wind farm is then connected to the electrical supply grid and can supply real and reactive power to the electrical supply grid. In particular, it can supply as much real power to the electrical supply grid as it has already transmitted to the grid operator in block 418 as a guaranteed minimum power. If need be, a renewal of this information about the guaranteed minimum power can be reported to the grid operator at this juncture. However, too much time should not elapse from the step of reporting guaranteed minimum power according to block 418 to the step in which the farm connects to the blacked-out grid section, according to block 440, namely ideally only a few minutes, so that the wind forecast and the guaranteed minimum power derived therefrom should still be relevant.

At any rate, the grid operator then establishes the electrical supply grid at least up to this guaranteed minimum power. This step is represented by block 442. For this, the grid operator can connect particularly loads, load groups or load clusters.

In general, the grid operator then takes on power control of the relevant electrical supply grid, at least of the section thereof that is relevant in this case, according to block 444.

There now exists an electrical supply grid or corresponding grid section that basically operates at rated voltage, and the grid operator can now connect further suppliers to the grid according to the next step in block 446. Such suppliers can be further wind farms, or else conventional power stations.

The electrical supply grid or the section thereof under consideration is now well on the way to normal operation. This normal operation is not yet in place, however, and, to continue towards it, it is now proposed, depending on the grid situation, that in one case the wind power installation and hence the wind farm change to a grid reestablishment mode, represented by block 448. Such a grid reestablishment mode relates particularly to a mode in which separate grid sections are gradually connected and, in so being, are possibly also gradually ramped up.

Alternatively, each wind power installation and hence the wind farm remains in the black start mode, which is also referred to as establishment mode here. In this case, the wind power installations or the wind farm supply a real power according to a stipulation by the grid operator. At the same time, each wind power installation or the wind farm provides voltage and frequency stability. Fundamentally, the wind farm can provide this voltage and frequency stability, this regularly being able to be performed by the wind power installations in each case independently. The task of a central farm control unit can then, that is to say according to this one embodiment, concentrate on providing a setpoint value for the real power for each wind power installation, based on a by and large prescribed real power setpoint value by the grid operator for the farm. The grid operator thus provides a real power setpoint value to the central farm control unit. The central farm control unit takes this as a basis for providing individual real power setpoint values, preferably by virtue of specifications of any percentage values, to the wind power installations. The wind power installations supply this real power in line with its setpoint value and at the same time take a voltage and frequency measurement or other recording as a basis for providing support, in particular stability of these voltage and frequency values. This maintained black start mode, in which the wind power installations provide voltage and frequency stability, is provided for according to block 450 as an alternative to block 448.

At any rate, this should mean that a black start has then been performed and if need be grid establishment has been achieved, and the grid operator can finally assess whether the electrical supply grid is operating normally again. In that case, it reports the presence of normal operation according to block 452.

In a last step according to block 454, the farm, in particular under the control of the central farm control unit, will then change to its normal operation in principle. This normal operation means particularly that as much real power as possible is generated and supplied, namely preferably as much real power as can be generated on the basis of the available wind. Additionally, as fast as possible, each wind power installation is operated at a speed adapted to the situation in this case. During operation under full load, it is thus preferably operated at rated speed, and during operation under partial load according to a speed performance characteristic, other normal management options naturally also being possible.

In regard to this described sequence, it should particularly be pointed out that some elements relate in particular to aspects of the communication, and these are denoted by the reference sign 1. This relates in particular to blocks 404-420 and 438-452.

Aspects concerning special features of the closed-loop control are denoted by the reference sign 2 and relate in particular to blocks 420-436 and 440.

Figure 5:
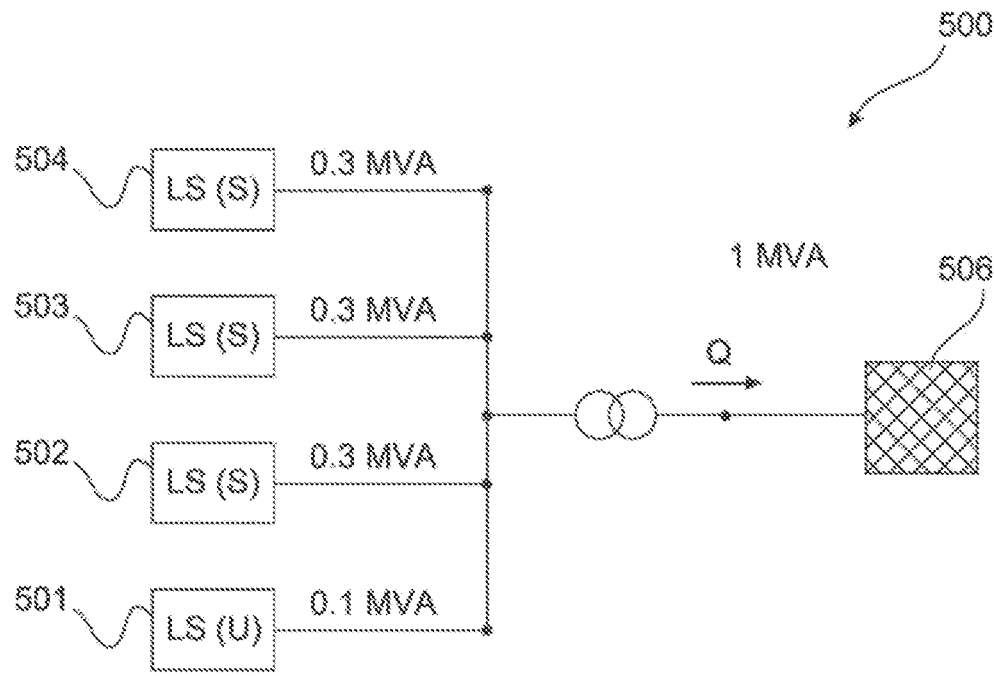
FIG. 5 schematically shows a wind farm in a starting state.

FIG. 5 illustrates a simplified wind farm 500 in a reestablishment mode. In the example shown, it has at least four power cabinets 501 to 504. The first power cabinet 501 is provided as a voltage influencing power cabinet in this case. It therefore forms a voltage influencing means. This voltage influencing power cabinet 501 is supposed in particular to prescribe a voltage. In this case, it is also supposed to be able to supply power, in particular reactive power Q, but only to a small extent. A value of 0.1 MVA is indicated here in exemplary fashion.

The other three power cabinets 502-504 are provided as current influencing power cabinets, that is to say as current influencing means. They can individually or collectively form an initial supply means. Each of these power cabinets is intended to be able to supply a greater reactive power Q than the first power cabinet 501. The dimensioning variable indicated at this junction in exemplary fashion for each of the power cabinets 502-504 is a reactive power value of in each case 0.3 MVA. Together, these four power cabinets 501-504 can supply a reactive power Q at a level of 1 MVA to the grid 506 shown in exemplary fashion.

This wind farm 500 can also contain further suppliers, particularly further wind power installations, which can likewise support an establishment mode or which are first connected during normal operation or in the further course of the establishment mode.

However, FIG. 5 is intended particularly to clarify the initial split, according to which one unit operates in a voltage influencing manner, in this case the power cabinet 501, and in so doing is supposed to supply less reactive power, whereas further units, or possibly only one further unit, operate in a current influencing manner, in this case the power cabinets 502-504, and can also supply a large amount of reactive power Q for voltage backup. The power cabinets 501-504 shown in exemplary fashion can also, by way of example, be fully accommodated in a black starting container as a black starting unit, which is provided particularly for such an establishment mode and can contain a battery providing sufficient energy for such an establishment mode, or another energy store.

The power cabinets 501-504 can alternatively each be representative of a wind power installation that operates either in a voltage influencing manner according to power cabinet 501 or in a current influencing manner according to one of the power cabinets 502-504. Each wind power installation can naturally generate and supply more power, including more reactive power, in this case and possibly have multiple power cabinets therefor.

Figure 6:
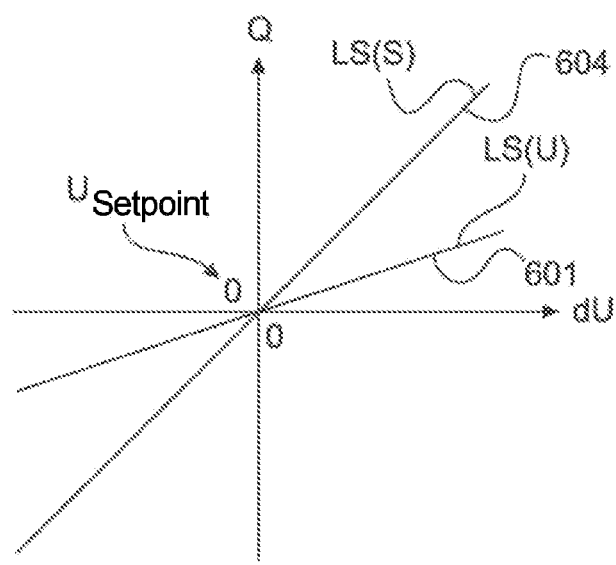
FIG. 6 show a graph with different droops.

FIG. 6 illustrates different droops in this regard that indicate a reactive power Q on the basis of a voltage deviation dU. The characteristic curves shown are intended to be taken as a basis for controlling the applicable power cabinets 501-504 of FIG. 5, namely such that the power cabinet 501, which operates in a voltage influencing manner, operates according to curve 601, whereas the current influencing power cabinets 502-504 each operate according to curve 604. Each of the power cabinets 502-504 therefore supplies three times as much reactive power Q as the voltage influencing power cabinet 501 for the same voltage deviation, that is to say for the same dU in the example shown.

Wherein the voltage influencing power cabinet 501 adapts the voltage deviation dU over a setpoint voltage in accordance with the reactive power Q that is obtained and the current influencing switchgear cabinets adapt the reactive power Q in accordance with the recorded voltage deviation dU. This voltage deviation can be recorded at output terminals of the inverter.

In this case, the graph of FIG. 6 shows the reactive power value 0 and the difference voltage dU with the value 0 at its origin, that is to say the center of the coordinate cross. The fact that the difference voltage dU has the value 0 means that the voltage at that point has the setpoint value $U_{setpoint}$.

FIG. 6 shows droops for a reactive power on the basis of a voltage deviation. In the same manner, droops for a real power on the basis of a frequency deviation are also proposed. In particular, in FIG. 6, the voltage deviation dU on the abscissa could be swapped for a frequency deviation df and the resultant reactive power Q on the ordinate could be swapped for a resultant real power P. What is then obtained is a depiction for droops for a real power on the basis of a frequency deviation. For this too, it is proposed that the initial supply means, that is to say in this case the current influencing power cabinets 502-504, each supply more real power for the same frequency deviation than the initial supply means, that is to say in this case the voltage influencing power cabinet 501.

Analogously, in this case too, the voltage influencing power cabinet 501 supplies a voltage at the frequency f in accordance with the real power obtained and the current influencing switchgear cabinets supply the real power in accordance with the recorded frequency or frequency deviation.

Figure 7:
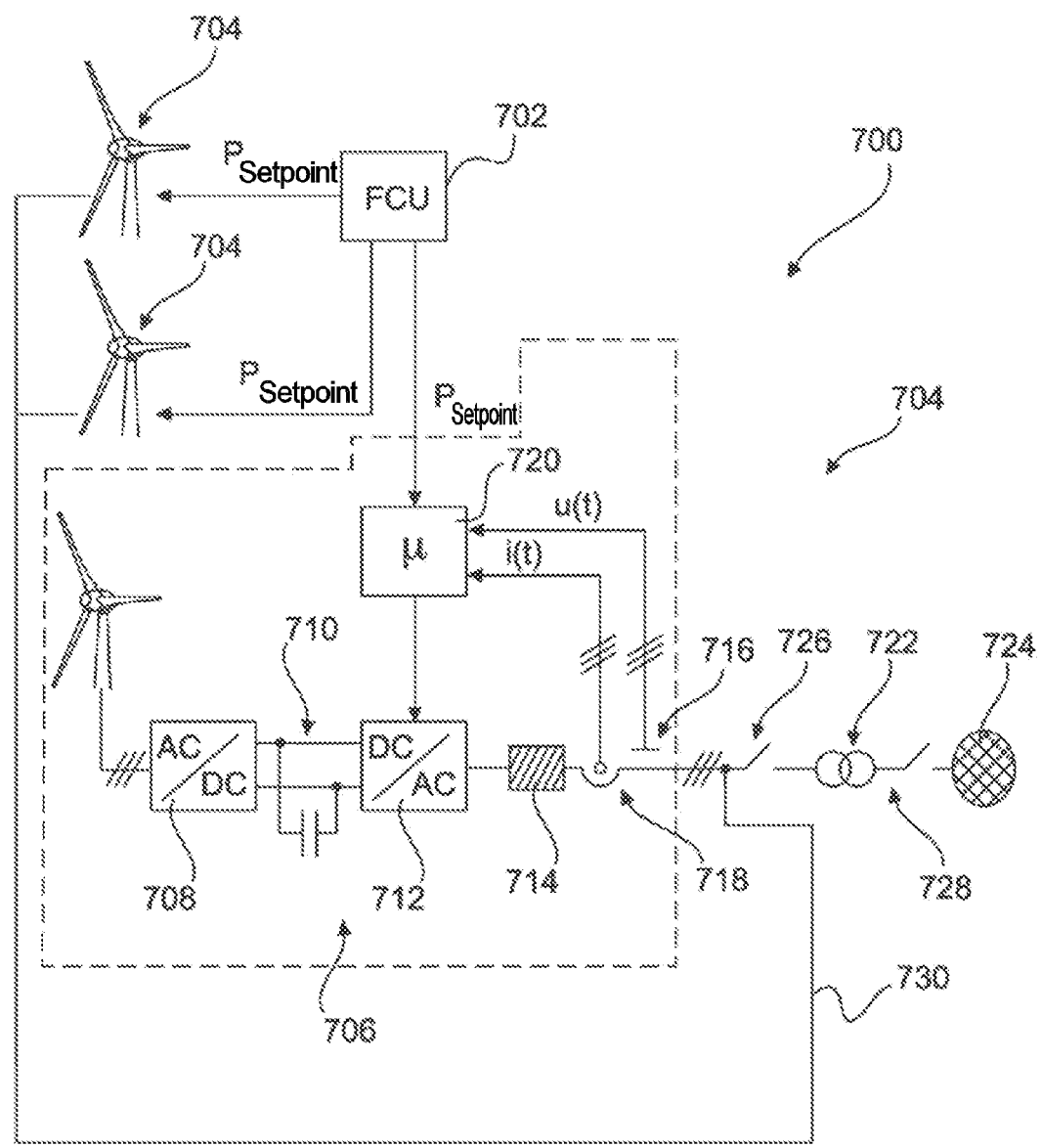
FIG. 7 schematically shows a wind farm and some details of control of the wind power installation shown.

FIG. 7 schematically shows a wind farm 700 having a central farm control unit 702 having, in exemplary fashion, three wind power installations 704, two of which are only indicated by a symbol and one of which additionally has a control device 706 schematically shown for it.

The control device 706 shown has a rectifying unit 708 having a connected DC link circuit 710 and a downstream inverter 712. The rectifying unit 708 having the DC link circuit 710 and the inverter 712 can also be referred to collectively as a converter.

The rectifying unit 708 is fed by a generator of the wind power installation, as only indicated in FIG. 7. The energy or power thus obtained is rectified by the rectifying unit 708 and provided on the DC link circuit 710. The inverter 712 generates a three-phase AC voltage or AC current therefrom. To this end, the inverter has an inductor 714 connected to it, to which the inverter is matched. At the output of this inductor 714, a voltage u(t) and a current i(t) are therefore measurable, and there is also provision for a voltmeter voltage measuring device or voltmeter 716 and a current measuring device or ammeter 718 for measurement. The voltage thus recorded and the current thus recorded are fed back to an inverter controller 720, and this inverter controller 720 takes this as a basis for actuating the inverter 712.

The central farm control unit 702 can transmit a power setpoint value $P_{setpoint}$ to each wind power installation 704. If the wind power installations 704 are each of the same size, there is also the possibility of these values being the same. In actual fact, these power setpoint values $P_{setpoint}$ are only meant to be representative of possible power setpoint values, which can even have different values, or to be able to be transmitted as relative values, for example percentage values.

In the depicted control device 706 of one wind power installation 704, it is clarified that this power setpoint value $P_{setpoint}$ is transferred to the inverter controller 720. There is also the possibility of other control or evaluation architectures in the wind power installation 704, however.

The control device 706 shown in FIG. 7 can operate as a current influencing unit or as a voltage influencing unit. If it operates as a voltage influencing unit, particularly the fed-back voltage u(t) is used to control the inverter 712. The latter can then generate and output a voltage signal such that it particularly corresponds to a prescribed voltage characteristic. The inverter operates in a voltage influencing manner as a result.

It can also operate in a current influencing manner by substantially orienting itself to the recorded and fed-back current i(t) and generating an applicable current signal, that is to say operating such that its output is particularly tracked to the current according to a current setpoint value.

This current and voltage influencing particularly involves the specific sinusoidal signal that the inverter generates or attempts to generate being prescribed. Accordingly, FIG. 7 depicts the instantaneous values u(t) and i(t) for the voltage and current for feedback. Naturally, the inverter controller 720 can additionally also evaluate the amplitude of the respective signals in the spirit of an RMS value and can use said amplitude, if necessary. This feedback of the instantaneous values must also be understood in phases in each case, that is to say that three current values and three voltage values are fed back each time.

The inverter 712 can therefore operate in different ways and in so doing generate a power and supply to the grid 724 using a farm transformer 722. The other wind power installations can use the same farm transformer 722 to supply to the electrical supply grid 724.

Additionally, there is provision for a respective isolating switch 726 or 728 both on the farm and toward the electrical supply grid 724. Indicated upstream of the isolating switch 726 is a connecting line to the other wind power installations 704, this representing a farm grid 730 in this case.

For a black start, in particular for operating the control device 706 in an establishment mode, there can be provision for an additional battery, which is not depicted in this case. Such a battery can power the DC link circuit 710, for example. A DC voltage of such a battery can be provided in a simple manner as a result and if need be converted into an AC voltage or an AC current by the inverter 712.

Figure 8:
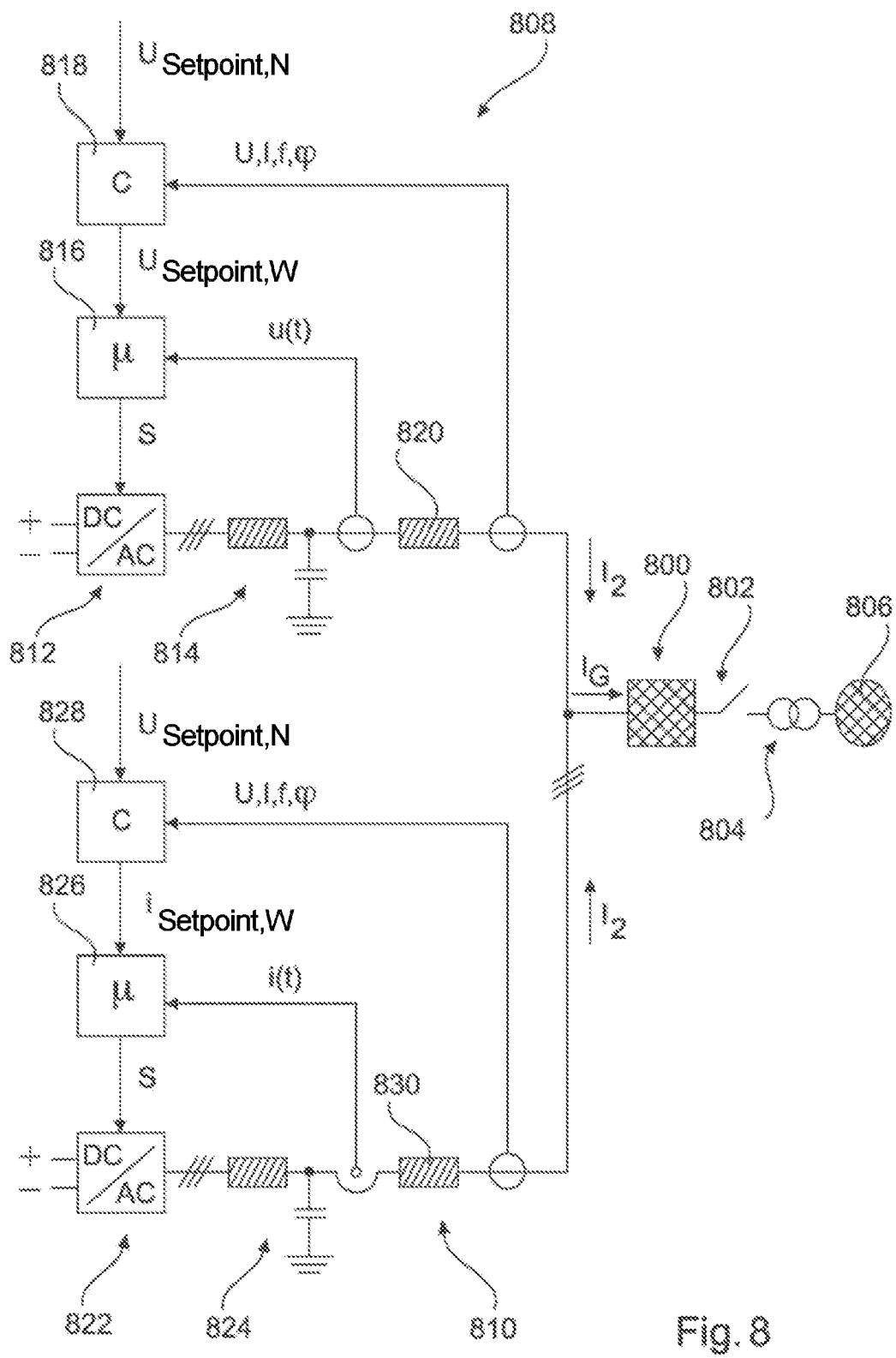
FIG. 8 illustrates the interplay between a voltage influencing means and an initial supply means.

For illustrative purposes, FIG. 8 shows an energy generation grid 800 couplable to an electrical supply grid 806 via an isolating switch 802 and a farm transformer 804.

A voltage-influencing device 808 and an initial supply device 810, which are themselves also part of the energy generation grid 800, are shown for illustrative purposes.

The voltage influencing device 808 has a voltage influencing inverter 812 that generates a voltage u(t) at its output and which voltage is in particular measured at the output of the indicated first output filter 814. The voltage u(t) is continually measured and fed back to the first microcontroller 816. The first microcontroller 816 therefore evaluates the instantaneous values of this measured voltage u(t). These measured values, just like the output voltage, are also three-phase. However, an explanation of FIG. 8 does not require this three-phase condition to be discussed. This also applies for the initial supply device 810.

The first microcontroller 816 is additionally provided with a voltage signal $u_{setpoint,w}$ specifying the voltage u(t) to be set according to magnitude, frequency and phase.

This setpoint value $u_{setpoint,w}$ is generated in the first inverter controller 818. It is dependent on a setpoint voltage $U_{setpoint,N}$ and the measured values U, I, f, φ measured at the output of the first grid inductor 820.

The initial supply device 810, which operates in a current influencing manner, has a current influencing inverter 822 that operates in a similar manner to the voltage influencing inverter 812 but regulates to an output current i(t). This output current i(t) is recorded at the output of the indicated second output filter 824 and evaluated in the second microcontroller 826. The second microcontroller 826 is therefore provided with a current setpoint value $i_{setpoint,w}$ that prescribes the current i(t) to be generated according to magnitude, frequency and phase. The second microcontroller 826 accordingly controls the switching actions in the current influencing inverter 822, this being indicated by the reference sign S. Accordingly, the first microcontroller 816 otherwise controls switching actions in the inverter 812.

The current setpoint value $i_{setpoint,w}$ is determined in the second inverter controller 828. It is dependent on the voltage U, the current I, the frequency f and the phase angle φ, and these variables are recorded at the output of the second grid inductor 830. The second inverter controller 828 also receives a setpoint voltage $U_{setpoint,N}$ as an input variable too.

The voltage influencing device 808 therefore ultimately generates a first current $I_1$ and $I_2$ the initial supply device 810 ultimately generates a second current $I_2$. These two currents $I_1$ and $I_2$ are summed to produce the joint current $I_G$. This flows into the symbolized energy generation grid 800 as an illustration. This is intended to be understood as an illustration because the voltage influencing device 808 and the initial supply device 810 are also part of the energy generation grid 800. Therefore, the joint current $I_G$ flows into the remaining portion of the energy generation grid.

During operation, for example when a sudden change in reactive power occurs in the energy generation grid 800, this becomes noticeable in the joint current $I_G$. As the output current $I_2$ of the first supply device 810 is regulated by the latter, a change in the joint current $I_G$ therefore initially leads to a change in the first current $I_1$ of the voltage influencing device 808.

The change in the joint current $I_G$ has therefore initially led to a change in the first current $I_1$, and this has been recorded by the first inverter control 818. The first inverter controller 818 records a new value for a voltage amplitude and/or a frequency therefrom on the basis of a reactive power droop or real power droop. Accordingly, the voltage setpoint signal $u_{setpoint,w}$ is adapted and transferred to the first microcontroller 816. The latter then accordingly actuates the voltage influencing inverter 812. This accordingly leads to a change in the voltage amplitude and/or in the frequency of the voltage, and this is measured by the initial supply device 810 by virtue of the measurement at the output of the second grid inductor 830 and evaluated in the second inverter controller 828. On the basis of this, a new reactive power value and/or a new real power value is then calculated, namely on the basis of the underlying reactive power droop or real power droop. Accordingly, a setpoint current signal $i_{setpoint,w}$ is prescribed and transferred to the second microcontroller 826. The latter then actuates the current influencing inverter 822 accordingly. The result is that the second current $I_2$ now changes, as a result of which the first current $I_1$ also changes and this in turn leads to a new adaptation by the first inverter controller 818, namely again based on the applicable droops, that is to say the reactive power droop and/or the real power droop.

Ultimately, the voltage influencing device 808 and the initial supply device 810 will therefore adjust themselves to one another such that they supply an applicable real or reactive power according to the droop relevant to them for the same voltage deviation and the same frequency.

A solution for starting an energy generation grid is therefore proposed, particularly for starting a farm grid. In this regard, the general points below are emphasized.

An important aspect for starting an energy generation grid and hence ultimately also for starting and reestablishing an electrical supply grid or a section thereof is suitable communication. In this regard, it is proposed that there is provision for an uninterruptable power supply for a central farm control unit. Said uninterruptable power supply has in particular a battery in order to provide sufficient energy in the grid for operating the central farm control unit even in the event of a power failure. Additionally or alternatively, power can be supplied in a self-supply mode of the wind power installation, that is to say a self-supporting mode of the wind power installation or of the wind farm. To this end, there can be a direct connection to the wind power installation, for example to a DC link circuit, by means of a DC voltage cable. Additionally or alternatively, there can also be provision for an AC voltage connection to an AC voltage output of an inverter of the wind power installation. There is ultimately also the possibility of the central farm control unit being accommodated locally in a wind power installation and, at that location, preferably using energy of the wind power installation that the latter generates in a self-supporting mode, that is to say a self-supply mode.

Communication modules in the wind power installations and if need be black starting units are also proposed. For this, there can particularly be provision for communication according to the system PoE, in the case of which power is supplied via an available Ethernet cable. In this case, it is particularly proposed that energy is supplied to the wind power installations from the central farm control unit, which in particular can be present as a result of an uninterruptable power supply, via the Ethernet cable.

Additionally or alternatively, it is possible to propose providing a separate battery for each wind power installation or at least multiple separate batteries for some wind power installations.

There is also the possibility of the wind power installation supplying power to itself in a self-supporting mode as soon as it has recovered after a grid outage.

Furthermore, communication with the grid operator is proposed, namely that there is provision for a communication interface for this.

Such a communication interface is particularly intended to be used to communicate when there is a grid collapse and also when normal operation is resumed. This information is particularly intended to be transmitted by the grid operators to the central farm control unit.

This can likewise be used to make a black start request from the grid operator to the central farm control unit, and conversely the central farm control unit can use it to indicate its readiness to perform such a black start if applicable.

Furthermore, this is intended to be used to receive or transmit a weather forecast from the central farm control unit. As a result, the central farm control unit is meant to transmit a guaranteed minimum power to the grid operator so that the latter can plan on the basis of this guaranteed minimum power. The aforementioned black start request can also be dependent on such a delivered guaranteed minimum power.

Furthermore, it is proposed to use such a communication interface with the grid operator for power control. This relates in particular to the prescribing of real power setpoint values by the grid operator to the central farm control unit.

In particular, this can also be used for grid reestablishment, which may be part of the starting of the energy generation grid. Preferably, the grid operator can also take controlling action, in particular can change over between types of control, in particular between the normal operating mode and the establishment mode.

Finally, it is also possible for a mode to be transmitted that indicates this stage of the electrical supply grid after further units are connected. In this case, information about a state of a grid reestablishment or further voltage and frequency stabilities can be transmitted. Both a grid reestablishment that has been achieved and a grid reestablishment that is desired can be communicated in this case. It is also possible for a working voltage and frequency stability or a desired voltage and frequency stability to be communicated by this means.

In a black start mode, which contains or corresponds to the described establishment mode, particularly the wind power installations and possibly a central farm control unit are affected on a wind farm.

First of all, it is proposed to transmit a signal for isolating all the circuit breakers on the low, medium and high voltage sides, insofar as these voltage levels are present.

Furthermore, it is proposed to transmit a black start signal to black starting units. These may be wind power installations that are accordingly prepared, particularly those that can operate as voltage influencing means and/or as initial supply means.

Such black starting units then establish an internal grid.

In this regard, it is particularly proposed that a voltage influencing wind power installation and/or a voltage influencing power cabinet, which may be part of the wind power installation, but may also be, or may contain, a UPS, for example, puts a DC busbar online at decreased voltage. It thus ensures that a busbar, that is to say a DC link circuit of a converter or inverter, has at least one voltage that has decreased in comparison with the normal operating mode.

The supply from a DC link circuit can be provided in what is known as a self-supply mode, which can also be referred to as a self-supporting mode, in which the wind power installation generates as much power as it needs itself for its own supply. Additionally or alternatively, there is also the possibility of a supply from a battery or other energy store. By way of example, there can also be provision for a battery in order to initially start the relevant wind power installation in the first place.

There is also the possibility of coupling to a DC link circuit of a UPS.

For wind power installations, it is particularly proposed that a supply is first provided from a battery or similar store, such as for example a capacitor, and then from the DC link circuit of the wind power installation, if the latter has been ramped up to its self-supply mode.

In a further step, it is proposed that current influencing wind power installations, at least current influencing power cabinets, are able to connect to one another and supply power together.

It is then proposed that operating points of the energy generation grid, that is to say particularly of the farm grid, are set such that voltage influencing power cabinets, or voltage influencing wind power installations, generate as little real and/or reactive power as possible.

Transformers of the wind power installations or of other units in the energy generation grid are then connected. In the wind farm, a farm grid is connected for the units involved in starting the wind farm, in particular wind power installations, and these units, in particular wind power installations, are then connected to one another and can interact.

Further black starting units, if present, can synchronize to and support one another.

In a further step, the remainder of the units, particularly the remainder of the wind power installations if the energy generation grid is a wind farm, connect to one another.

Furthermore, a transformer at the grid connection point, which can be referred to as a farm transformer in the case of a wind farm, can then be connected.

For the further establishment, it is then proposed to ramp up a setpoint voltage. This can be effected using a control signal of a central farm control unit.

It is then possible for voltage and frequency stability to be provided as part of the black start mode.

To this end, the wind farm regulates the voltage and frequency of the wind farm, that is to say of the energy generation grid, and/or of the electrical supply grid. The latter is particularly when the electrical supply grid has already been connected to the energy generation grid again for power exchange.

In this case, sudden changes in real and reactive power can be provided by the voltage influencing wind power installations or power cabinets in a short initial time, particularly in the first few milliseconds. In this respect, these voltage influencing units briefly take on these sudden changes in power. The supply of power is then intended to be taken on by quickly regulating current influencing units, particularly wind power installations or power cabinets, however. These current influencing units are therefore prepared to provide, or supply, power quickly. This can be effected by means of current regulation, in which an actual current is fed back and compared with a current setpoint value for the purpose of correction.

It is then possible for a synchronization mode and/or a mode in which a frequency constancy is regulated to be used. When there is frequency constancy, the prominent feature is that the frequency in the energy generation grid and/or in the electrical supply grid does not change or changes only little, whereas correction to an absolute frequency value is not a prominent feature, and can be suspended.

According to one embodiment, it is proposed to use different control gains for the voltage backup for the voltage influencing units and the current influencing units. Control gains for the voltage backup that result particularly in a reactive power being supplied on the basis of a voltage deviation are also referred to as droop. The different control gains, as different droops or a different gradient of the droops, mean that voltage influencing units, in particular voltage influencing converters, take on only a very small portion of a reactive power to be supplied for voltage backup in steady-state operation. Although sudden changes in reactive power are taken on by voltage influencing means in this case, such as by voltage influencing converters, they are then quickly taken over by initial supply means, particularly by current influencing converters.

Frequency dependent controls of real power, which are also referred to as real power droops, are also intended to be set such that the operating point of the voltage influencing converter in regard to its supplied real power is just above zero, that is to say that in the case of frequency deviation the altered real power is relatively low, in comparison with the current influencing power cabinets. When positive real power is released, the voltage influencing converter takes over first and the current influencing converters then quickly adjust. Even when a negative real power is released, that is to say when a power reduction needs to be performed, the voltage influencing converter takes over first and draws real power. A fast load, in particular a chopper controller, can then destroy this power. In the case of a chopper controller, the chopping, that is to say pulsed control, controls a current into a resistor unit, or resistor bank, having nonreactive resistors, in order to convert the electrical power to be destroyed into heat there.

It has particularly been recognized that although system services from wind power installations are sufficiently well known, they had hitherto essentially been matched to the physical properties of the previously dominating supply technology, namely large power stations having synchronous machines.

It has been recognized that, in the short and medium terms, that supply technology that dominates at the moment should take on the system responsibility, depending on the grid operating point. The reason is that this is then either a conventional supply technology with directly coupled synchronous machines or a converter-based supply technology. It has also been recognized that simple modeling of conventional and hence slow generators by converters is not necessarily expedient. This recognition is also relevant for a black start and an intelligent grid reestablishment after a blackout on a grid.

Open-loop and closed-loop control strategies have therefore been proposed for wind farms in order to perform the black start in a black start situation and to support the grid establishment, in particular to support it intelligently or even to speed it up in comparison with a black start and grid reestablishment for conventional suppliers.

In particular, an increase in a converter-based generation component is intended to be achieved in electrical supply grids, particularly interconnected grids. To this end, a control concept has been developed for grids, namely for grids that at times is able to be operated almost completely by means of converter-coupled or converter-controlled supply of renewable energies without having to cut back on system safety.

Particularly one or more of the following aims can be achieved, namely:
  possible black start with regenerative power station capacities;
  accelerated grid reestablishment with regenerative power station capacities;
  grid integration of an intermittently very high proportion of regenerative energies in the grid;
  safe grid operation even in grids that are at times supplied with power almost completely on a converter basis;
  system responsibility in the electrical energy supply being taken on by wind power installations;
  avoidance of a supposedly technically related upper limit for regenerative energies, particularly wind power installations in an electrical supply grid;
  substitution of conventional power stations; and
  increase of acceptance of regenerative suppliers by grid operators.

The proposed solution is particularly based on the idea of breaking down the steps for a black start into two functions groups.

These are the two functional groups:
  1. Communication in the event of power failure
  2. Black start mode for units, particularly wind power installations on the wind farm and for a central farm control device One possibility for the sequence, particularly taking into consideration these two functional groups, is explained in FIG. 4. There, these two functional groups are likewise provided with the applicable number 1 or 2.

An important aspect is the power split between voltage influencing and current influencing units, that is to say in particular converters and power cabinets. This has the following purpose or background:
  As a result of a different gradient of the droops shown in FIG. 6, a voltage influencing converter takes on only a very small portion of the reactive power, that is to say contributes only a very small portion of the total supplied reactive power.
  Sudden changes in reactive power are initially taken on by the voltage influencing converter and then quickly corrected by the current influencing converters.
  Even for real power droops, that is to say a frequency-dependent or frequency-deviation-dependent supply of real power, are preferably set such that the respective operating point of the voltage influencing converter is only just above zero, that is to say is chosen such that only little real power is supplied.
  When positive real power is released, that is to say when real power is intended to be supplied to the electrical supply grid, the voltage influencing converter initially takes on the excess power and the current influencing converters then quickly adjust, so that the voltage influencing converter does not or only very briefly have to take on this task. The voltage influencing converter can react very much more quickly, particularly to voltage changes, than the current influencing converter, however, and thus immediately takes on such a release of positive real power. In this case, it should be borne in mind that in particular real power requirements initially become noticeable in the voltage, that is to say in voltage changes of the electrical supply grid. This can also relate to a phase shift or then a frequency change of the voltage. The supplied current then changes only as a reaction thereto. Thus, the voltage influencing converters initially take on such releases of real power or sudden changes in reactive power, while the current influencing converters then quickly take over and quickly adjust.
  Even in the event of a negative sudden change in real power, that is to say if the real power is reduced, the voltage influencing converter takes over and draws real power. In this regard, it is proposed that choppers or a chopper circuit having applicable nonreactive resistors then convert such power, specifically by which a reduction has taken place, into heat until the current influencing power cabinets, that is to say the current regulating converters, have adjusted accordingly.

The invention claimed is:

1. A method for starting a wind farm grid of a wind farm, wherein the wind farm grid has at least one grid connection point connected to an electrical supply grid, and wherein the wind farm grid, in a normal operating mode, exchanges electrical power with the electrical supply grid via the grid connection point, the method comprising:
  selecting an establishment mode, different than the normal operating mode, in response to the electrical supply grid having a voltage drop or the wind farm grid being isolated from the electrical supply grid; and
  operating the wind farm grid in the establishment mode, wherein in the establishment mode:
    at least one voltage-influencing wind power installation provides a wind farm grid voltage, at least one current-influencing wind power installation synchronizes to the wind farm grid voltage provided via the at least one voltage-influencing wind power installation, and the at least one voltage-influencing wind power installation and the at least one current-influencing wind power installation in total provide an electrical power in the wind farm grid, wherein operation of the at least one voltage-influencing wind power installation is based on at least a first droop and operation of the at least one current-influencing wind power installation is based on at least a second droop, wherein the first droop has a smaller gradient than the second droop, and wherein each droop of the first and second droops describes a respective relationship between:

a voltage of the wind farm grid and a reactive power to be supplied or that has been supplied; or a frequency of the wind farm grid and a real power to be supplied or has been supplied.

2. The method as claimed in claim 1, wherein the at least one voltage-influencing wind power installation provides the wind farm grid voltage substantially without power, or supplies a power that is 20% lower than a power supplied by the at least one current-influencing wind power installation.

3. The method as claimed in claim 1, wherein the at least one voltage-influencing wind power installation operates in a voltage-influencing manner to provide the wind farm grid voltage.

4. The method as claimed in claim 1, wherein the at least one current-influencing wind power installation operates in a current-influencing manner to provide an electrical power in the wind farm grid.

5. The method as claimed in claim 1, wherein the operation of the at least one voltage-influencing wind power installation is based on a first reactive power droop describing a relationship between a voltage to be provided by the at least one voltage-influencing wind power installation in the wind farm grid and a reactive power supplied by the at least one voltage-influencing wind power installation, wherein the operation of the at least one current-influencing wind power installation is based on a second reactive power droop describing a relationship between the voltage of the wind farm grid and a reactive power to be supplied by the current-influencing wind power installation, and wherein:

the first reactive power droop has a smaller gradient than the second reactive power droop, the operation of the at least one voltage-influencing wind power installation is based on a first real power droop describing a relationship between a frequency to be provided in the wind farm grid by the at least one voltage-influencing wind power installation and a real power supplied by the at least one voltage-influencing wind power installation, the operation of the at least one current-influencing wind power installation is based on a second real power droop describing a relationship between a frequency recorded in the wind farm grid and a real power to be supplied by the at least one current-influencing wind power installation, and the first real power droop has a smaller gradient than the second real power droop.

6. The method as claimed in claim 5, wherein:

the at least one voltage-influencing wind power installation provides the voltage based on the supplied reactive power according to the first reactive power droop, the at least one current-influencing wind power installation supplies the reactive power based on the voltage of the wind farm grid according to the second reactive power droop, the at least one voltage-influencing wind power installation provides the frequency based on the supplied real power according to the first real power droop, and the at least one current-influencing wind power installation supplies the real power based on the recorded frequency according to the second real power droop.

7. The method as claimed in claim 5, wherein a gradient or gain of the second droop, second reactive power droop, or second real power droop is at least twice a gradient or gain of the first droop, reactive power droop, or real power droop, respectively.

8. The method as claimed in claim 1, comprising:

selecting of the establishment mode by changing from the normal operating mode to the establishment mode when the wind farm grid has a voltage drop.

9. The method as claimed in claim 1, comprising:

operating of the wind farm grid in the establishment mode only when the wind farm grid is de-energized.

10. The method as claimed in claim 1, wherein the at least one current-influencing wind power installation and a further current-influencing wind power installation are synchronized in a cascaded fashion to provide the electrical power in the wind farm grid.

11. The method as claimed in claim 1, wherein the electrical power provided by the at least one current-influencing wind power installation in the wind farm grid has at least one reactive power component that covers a reactive power requirement of the wind farm grid.

12. The method as claimed in claim 1, wherein the electrical power provided by the at least one current-influencing wind power installation in the wind farm grid has at least one reactive power component and one real power component, wherein the reactive power component is at least twice the real power component.

13. The method as claimed in claim 1, wherein the electrical supply grid has a supply voltage and the wind farm grid voltage is ramped up to the supply voltage to synchronize the wind farm grid to the electrical supply grid.

14. The method as claimed in claim 1, comprising:

connecting the wind farm grid to the electrical supply grid via a wind farm transformer in response to the wind farm grid having the wind farm grid voltage synchronized to the electrical supply grid or to provide a grid reestablishment voltage at the grid connection point in response to the electrical supply grid having no voltage.

15. The method as claimed in claim 1, comprising:

ramping down the at least one voltage-influencing wind power installation and the at least one current-influencing wind power installation such that the wind farm grid is de-energized if the electrical supply grid has a voltage drop.

16. The method as claimed in claim 1, wherein the at least one voltage-influencing wind power installation provides the wind farm grid voltage only when the wind farm grid is de-energized.

17. The method as claimed in claim 1, wherein the voltage drop is defined in relation to a rated voltage of the electrical supply grid as:
- a voltage less than 90 percent of the rated voltage;
- a voltage less than 70 percent of the rated voltage;
- a voltage less than 30 percent of the rated voltage; and
- a voltage less than 10 percent of the rated voltage.

18. The method as claimed in claim 1, wherein the at least one voltage-influencing wind power installation has a DC link circuit fed from a capacitance to provide the wind farm grid voltage, wherein the capacitance is configured to supply the DC link circuit with a DC voltage in the event of a voltage drop in the electrical supply grid or in the event of a de-energized wind farm grid such that the at least one voltage-influencing wind power installation provides a stable wind farm grid voltage.

19. The method as claimed in claim 1, comprising:
recording the voltage drop in the electrical supply grid or detecting a loss of voltage in the wind farm grid by monitoring a voltage of the at least one voltage-influencing wind power installation.

20. The method as claimed in claim 1, wherein the wind farm grid includes a power controller, wherein the at least one current-influencing wind power installation uses the power controller to supply an electrical power to the electrical supply grid based on a power setpoint value, wherein the power setpoint value is configured by an wind farm grid operator or by a grid operator of the electrical supply grid, or the electrical power is increased such that in the event of a system deviation it is corrected by an integral controller.

21. The method as claimed in claim 1, comprising:
holding back a portion of available electrical power of the at least one current-influencing wind power installation and releasing the held back portion to stabilize a frequency of the electrical supply grid;
limiting a supply of electrical power of the at least one current-influencing wind power installation if the wind farm grid or the electrical supply grid has a grid frequency that is an overfrequency; or
drawing electrical power from the electrical supply grid and consuming the drawn electrical power by a chopper apparatus.

22. The method as claimed in claim 1, wherein the wind farm grid is configured to receive a weather forecast or to produce a weather forecast, wherein the weather forecast is used to determine a time at which operation of the wind farm grid in the establishment mode is started.

23. The method as claimed in claim 1, wherein the at least one voltage-influencing wind power installation and the at least one current-influencing wind power installation each operate as voltage-influencing or current-influencing wind power installations by actuation, wherein the at least one voltage-influencing wind power installation operates as an initial supply wind power installation by changing the actuation and the initial supply wind power installation operates as the voltage-influencing wind power installation by changing the actuation.

24. A wind power installation comprising:
a controller; and
a converter configured to operate in a voltage-influencing or current-influencing fashion, wherein the controller actuates the converter such that the wind power installation is configured to be used as the voltage-influencing wind power installation or as the current-influencing wind power installation in the method as claimed in claim 1.

25. The wind power installation as claimed in claim 24, comprising:
a chopper apparatus configured to consumer electrical power from the wind farm grid to support frequency backup control.

26. A wind farm, comprising:
at least one first and one second wind power installation, wherein the at least one first wind power installation operates in a voltage-influencing fashion and the at least one second wind power installation operates in a current-influencing fashion to perform the method as claimed in claim 1.

27. A wind farm, comprising:
at least one first inverter configured to operates in a voltage-influencing fashion, and at least one second inverter configured to operates in a current-influencing fashion to perform the method as claimed in claim 1, wherein the at least one first inverter configured to operate in the voltage-influencing fashion, and the at least one second inverter configured to operate in the current-influencing fashion are together coupled to an energy storage unit and together form a black starting unit and are configured to be used to operate an energy generation grid in the establishment mode such that the energy storage unit provides the at least one first and the at least one second inverter with energy to operate the establishment mode.

\* \* \* \* \*